US012782140B2

(12) United States Patent
Roel-Chapa et al.

(10) Patent No.: US 12,782,140 B2
(45) **Date of Patent: *Nov. 3, 2026**

(54) SENSOR-ACTUATOR AND ARTIFICIAL INTELLIGENCE-BASED WEARABLE DEVICE SYSTEMS AND METHODS

(71) Applicant: STRAP TECHNOLOGIES INC, Austin, TX (US)

(72) Inventors: Diego Roel-Chapa, Austin, TX (US); Adolfo Cota-Foncerrada, Austin, TX (US); Carlos Jesús Zúñiga Aguilar, Austin, TX (US)

(73) Assignee: STRAP TECHNOLOGIES INC, Austin, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/984,844

(22) Filed: Dec. 17, 2024

(65) Prior Publication Data

US 2025/0116519 A1 Apr. 10, 2025

Related U.S. Application Data

(63) Continuation of application No. 17/880,645, filed on Aug. 3, 2022, now Pat. No. 12,169,128.

(60) Provisional application No. 63/228,778, filed on Aug. 3, 2021.

(51) Int. Cl.

*G01C 21/16* (2006.01)
*G01C 21/20* (2006.01)
*A63F 13/285* (2014.01)

(52) U.S. Cl.

CPC ....... *G01C 21/165* (2013.01); *G01C 21/1652* (2020.08); *G01C 21/20* (2013.01)

(58) Field of Classification Search

CPC ...... G01C 21/16; G01C 21/20; G01C 21/188; G01C 21/1652; G01C 21/36; A63F 13/285; G01S 19/47

See application file for complete search history.

(56) References Cited

U.S. PATENT DOCUMENTS 10,257,434 B2 4/2019 Arnold
10,997,417 B2 5/2021 Birch
2016/0028917 A1 1/2016 Wexler et al.
2016/0184703 A1* 6/2016 Brav .................... A63F 13/213 463/30

(Continued)

*Primary Examiner* — Tan Q Nguyen
(74) *Attorney, Agent, or Firm* — Waterstone Edge

(57) ABSTRACT

Systems, methods, and computer-readable media are provided for wearable navigation systems. In some examples, a wearable navigation system may determine the distance between an object and one or more distance sensors based on signals received from an environment, where the distance sensors are part of a sensor package. In some aspects, the wearable navigation system may determine, using an inertial measurement unit, a position, speed, and acceleration of the wearable navigation system, where the inertial measurement unit is part of the sensor package. In some cases, the wearable navigation system may determine, by a Central Processing Unit (CPU) coupled to the sensor package, information associated with the object with respect to the wearable navigation system. In some instances, the wearable navigation system may generate, by an actuator system coupled to the sensor package, feedback signals in response to information associated with the object.

20 Claims, 17 Drawing Sheets

(56) References Cited

U.S. PATENT DOCUMENTS

| | | | | |
|---|---|---|---|---|
| 2018/0135986 | A1* | 5/2018 | Dayal ................ | G01C 21/3602 |
| 2019/0287296 | A1 | 9/2019 | Sipko et al. | |
| 2022/0057519 | A1 | 2/2022 | Goldstein et al. | |
| 2023/0304801 | A1* | 9/2023 | Russell ................ | G01C 21/165 |

* cited by examiner

3000

```
Algorithm 1: Dispersion algorithm
Input: signal
Input: lag
Input: influence
Input: threshold
peakIndices := [];
processedSignal := signal[0,...,lag];
for index := lag to len(signal) do:
if region1_x < index  < region1_y then
        th = th1
else if region2_x < index < region2_y then
        th = th2
else if region3_x < index < region3_y then
        th = th3
.
.
.
else if regionN_x < index < reguionN_y then
        th = thN
end
y := signal[index]
if y > th
        avg := average(processedSignal[(index-lag),..., index]);
        sd := stdev(processedSignal[(index-lag),...,index]);
        if abs(y-avg) > sd*threshold then
                peakIndices.push(index);
                adjustedValue := (influence*y) + ((1-influence)*prcessedSignal[index-1]);
        end
else
        proccesedSignal.push(y);

end
return peakIndices;
```

FIG. 3

SENSOR-ACTUATOR AND ARTIFICIAL INTELLIGENCE-BASED WEARABLE DEVICE SYSTEMS AND METHODS

CROSS-REFERENCE TO RELATED APPLICATIONS

The present application is a continuation application of U.S. application Ser. No. 17/880,645, filed Aug. 3, 2022, which claims the benefit of U.S. Provisional Application No. 63/228,778, filed on Aug. 3, 2021, each is hereby incorporated by reference in their entireties.

TECHNICAL FIELD

The present disclosure generally relates to the field of wearable device technology, and more specifically, to Sensor-Actuator and Artificial Intelligence-based Wearable (SAAI Wearable) systems and methods that assist the movement of people whose vision is compromised.

BACKGROUND

People's vision can be compromised for many reasons. According to The World Health Organization (WHO), 2.6% of the world's total population was visually impaired in 2002. Also, the American Foundation for the Blind (AFB) approximates that there are more than 25 million people in the United States living with vision loss. While blind people's vision is compromised for biological reasons, other people's vision can be compromised when they are exposed to certain environments. For example, in heavy fog, visible light is not suitable for detecting obstacles, even for people with normal vision. In the context of soldiers dealing with enemy combatants, projecting visible light to detect obstacles tends to expose soldiers to danger. In the context of people wearing a VR or AR display, vision of an environment may be limited. In any case, when people's vision is compromised, it is extremely hard for them to detect obstacles and the features of such obstacles in time to avoid them. Without proper assistance, such people risk tripping, running into moving vehicles, falling off cliffs, and even losing their lives.

SUMMARY

A wearable navigation system is disclosed. According to one aspect, a wearable navigation system includes a central processing unit (CPU) coupled to a sensor package, the sensor package attached at a first mounting surface of one or more mounting surfaces, the sensor package comprising one or more distance sensors and an inertial measurement unit. The distance sensors are configured to determine the distance between an object and the one or more distance sensors based on signals received from an environment. The inertial measurement unit is configured to determine a position, speed, and acceleration of the wearable navigation system. The CPU is configured to determine information associated with the object with respect to the wearable navigation system. An actuator system coupled to the sensor package and a second mounting surface, the actuator system configured to generate feedback signals in response to information associated with the object received from the CPU.

According to another aspect, the distance sensors include LiDAR, radar, and ultrasonic sensors.

According to yet another aspect, the inertial measurement unit comprises a 3D digital accelerometer, a 3D gyroscope, and a 3D digital magnetometer.

According to yet another aspect, distance is determined by measuring the time of flight of signals to return to the sensor package from the object.

According to yet another aspect, the actuator system comprises one or more actuators attachable at a plurality of levels, the actuator system being configured to provide feedback at one or more of the plurality of levels based on a height of the object. According to yet another aspect, the height of an object is determined based on which one of the distance sensors receives signals indicating the presence of the object.

According to yet another aspect, the sensor package includes a GNSS receiver.

According to one aspect, a method of navigation for a wearable navigation system includes determining the distance between an object and one or more distance sensors based on signals received from an environment, the distance sensors being a part of a sensor package; determining, by an inertial measurement unit a position, speed, and acceleration of the wearable navigation system, the inertial measurement unit being a part of the sensor package; determining, by a central processing unit (CPU) coupled to the sensor package information associated with the object with respect to the wearable navigation system; and generating, by an actuator system coupled to the sensor package, feedback signals in response to information associated with the object.

According to another aspect, the distance sensors include LiDAR, radar, and ultrasonic sensors. According to yet another aspect, the inertial measurement unit comprises a 3D digital accelerometer, a 3D gyroscope, and a 3D digital magnetometer. According to yet another aspect, distance is determined by measuring the time of flight of signals to return to the sensor package from the object. According to yet another aspect, the actuator system comprises one or more actuators attachable at a plurality of levels, and the method further includes: providing, by the actuator system, feedback at one or more of the plurality of levels based on a height of the object. According to yet another aspect, the method further includes determining the height of the object based on which one of the distance sensors receives signals indicating the presence of the object. According to yet another aspect, the sensor package includes a GNSS receiver.

According to yet another aspect, a non-transitory computer-readable storage medium comprising instructions stored therein, which when executed by one or more processors, cause the processors to perform operations comprising: determining the distance between an object and one or more distance sensors based on signals received from an environment, the distance sensors being a part of a sensor package; determining, by an inertial measurement unit a position, speed, and acceleration of the wearable navigation system, the inertial measurement unit being a part of the sensor package; determining, by a central processing unit (CPU) coupled to the sensor package information associated with the object with respect to the wearable navigation system; and generating, by an actuator system coupled to the sensor package, feedback signals in response to information associated with the object.

According to yet another aspect, the distance sensors include LiDAR, radar, and ultrasonic sensors. According to yet another aspect, the inertial measurement unit comprises a 3D digital accelerometer, a 3D gyroscope, and a 3D digital magnetometer. According to yet another aspect, the distance is determined by measuring the time of flight of signals to return to the sensor package from the object. According to yet another aspect, the actuator system comprises one or more actuators attachable at a plurality of levels, and the operations further including: providing, by the actuator system, feedback at one or more of the plurality of levels based on a height of the object. According to yet another aspect, the operations further include determining the height of the object based on which one of the distance sensors receives signals indicating the presence of the object.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 3 shows an example peak detection algorithm illustrating an example means of deciding peaks that represent obstacles in signals collected by a TOF sensor.

DETAILED DESCRIPTION

Figures 1A, 1B, 1C:
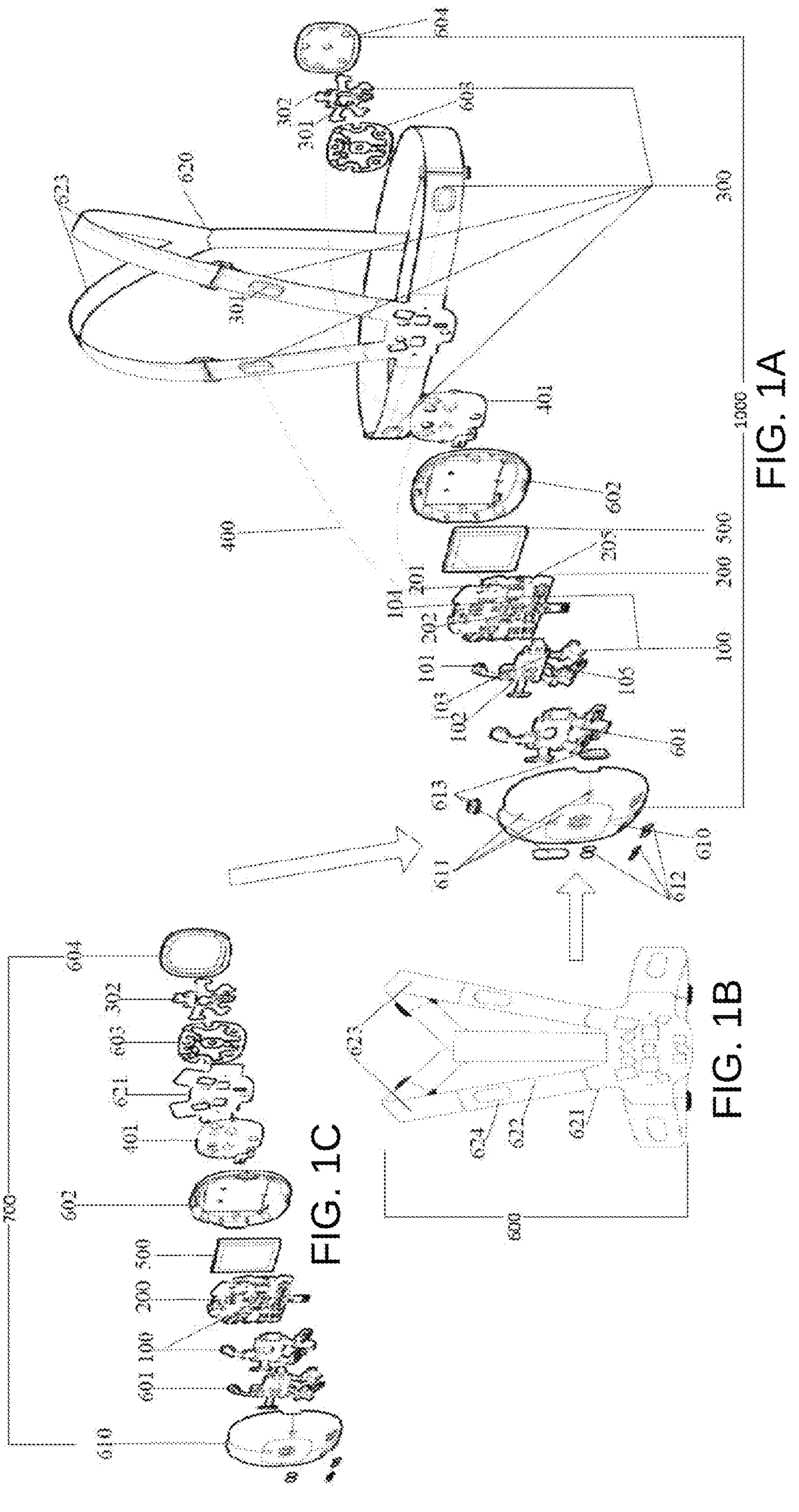
FIGS. 1A-C are illustrations of multiple views of a SAAI Wearable system 1000 depicting the structure that is wearable on a person's upper body, according to some aspects.

Unfortunately, although the risks to visually impaired people are huge, the most commonly used assistance is the proverbial "white cane," which provides limited navigational assistance. The white cane is typically a long cane that helps someone who is visually impaired navigate and avoid obstacles. For example, it is their visual aid that helps identify dents, platform edges, steps, and uneven surfaces. Some visually impaired people choose to use a white cane to move around, while others use it as a way to put people on notice of their visual impairment. White canes are often challenging for beginners to use because the learning curve of white canes is difficult to climb. People cannot walk smoothly and safely without enduring exhaustive protocols of detecting obstacles. Consequently, many people have to experience severe injuries before they master the use of the white cane.

White canes often do not provide adequate support for people who have been using them for many years. For example, white canes only detect obstacles on the ground level in their most common uses. This limitation exposes white cane users to enormous risks imposed by obstacles beyond the ground level. In addition, white canes do not provide feedback to inform their respective users of different types of obstacles that may require them to react in a manner unique to that type of obstacle. Furthermore, white canes cannot inform their respective users on how to move straight when the ground beneath them is very smooth. This specific limitation exposes a white cane user to other types of life-threatening risks, such as getting lost. Also, another limitation with white canes is they occupy their user's hands. Consequently, using white canes limits people's use of their hands and brings more inconvenience to their lives in addition to compromised vision. In general, people who have used white canes for years will lament numerous additional limitations of using white canes. There is a need for improving support for the visually impaired due to the aforementioned limitations of white canes. The visually impaired need tools that are much easier to use and better suited to resolve the unique challenges they experience in their day-to-day lives. The visually impaired not only need to avoid obstacles, but they are also entitled to feel the environment around them with greater freedom and flexibility than what is currently available to them.

Aspects of the present disclosure generally relate to improving mobility for the visually impaired through the use of various types of sensors to replace functions of compromised eyes in addition to actuators to aid in directing people's movements. In some aspects, the present disclosure generally relates to SAAI Wearable systems and methods, as well as methods and computer-executable instructions for implementing these systems and methods. In some aspects, the SAAI Wearable system described herein comprises a sensor package that collects and converts signals from environments and the system itself, an analysis system that implements multiple methods to guide the movement of a person who wears this system, an actuator system that sends electrical feedback signals to a person or user who wears this system, a signal transfer system for transferring signals collected by the sensor package to the analysis system and the actuator system, a battery, and a harness structure that assembles and mounts the sensor package, the actuator system, the signal transfer system, the analysis system, and the battery on a person.

In some aspects of the present disclosure, the SAAI Wearable systems and methods described herein may detect obstacles for a person with compromised vision. In some aspects, the SAAI Wearable may detect obstacles by implementing an Obstacle Detection (OD) method to the device. With the OD method, the sensor package may send and collect signals including but not limited to ultrasound or electromagnetic waves to the surrounding environment and receive feedback signal waves. The feedback signal waves may be converted to distance data in the sensor package or the analysis package, depending on the structure of different systems and methods disclosed herein. The analysis system may process the distance data and send analysis results in the form of electrical currents to drivers in the analysis system. Drivers may then activate the actuator system via an Actuator Feedback (AF) method and inform the SAAI Wearable user of the distances, locations, and features of obstacles in their moving path.

In some aspects of the present disclosure, the SAAI Wearable systems and methods disclosed herein are easy to use and informative to their users. The SAAI Wearable systems and methods disclosed herein may aid users to detect obstacles at different levels, sense obstacles' features in time, and free their hands as they walk. The SAAI Wearable systems and methods disclosed herein may allow people with impaired vision to avoid obstacles, feel the environment around them, and lead lives with greater emotional and physical well-being.

In some aspects, the SAAI Wearable methods and systems described herein may enable visually impaired people to move safely and effectively. In some aspects, the methods and systems described herein may guide the movement of SAAI Wearable users by utilizing sensors to collect signals and data from both the surrounding environments and from the SAAI Wearables themselves, analyzing such data with artificial intelligence, and applying analyzed results to inform the SAAI Wearable users of obstacles with electrical current-stimulated actuators.

In some aspects, the SAAI Wearable systems and methods disclosed herein may overcome many limitations of a white cane. These novel systems and methods may be capable of detecting obstacles beyond the ground level. Furthermore, the systems and methods disclosed herein may be able to detect the locations and features of obstacles. In addition, they may use multiple methods to provide various guidance to users. For example, the systems and methods disclosed herein may alert users of obstacles with the Obstacle Detection (OD) method described in further detail below, and may guide users to walk straight with Path Line Navigation (PLN) mode which is also described in further detail below. In addition, the systems and methods described herein may free up users' hands and allow users to move freely with less restraint compared to, for example and including but not limited to using a white cane as described above.

In some aspects, the SAAI Wearable systems and methods described herein may guide a person with compromised vision to walk straight. In some aspects, the SAAI Wearable systems and methods described herein may achieve this function by implementing a Path-Line Navigation (PLN) Method. In some examples, with the PLN Method, an SAAI Wearable user may set a preset path including, but not limited to, an imaginary straight line for the SAAI Wearable to guide that person. In some aspects, when the user starts to walk on this line, the PLN Method may apply an orientation filter, including but not limited to a Madgwick Filter, to process rotation rates collected by the sensor package and decide the user's orientation via the analysis system. The PLN Method may use acceleration rates collected by the sensor package to determine the speeds and displacements of the user as the user moves via the analysis system. With the orientation, the speed, and the displacement of the user, the PLN Method may decide whether the user has deviated from the imaginary path that that person has set. If the user deviates from his preset path, the analysis system may activate the actuator system via the AF Method to inform the person of the deviation from the preset path. Once the user walks back to the preset path, the actuator system is no longer activated.

In some aspects, SAAI Wearable systems and methods described herein may have the OD Method, the PLN Method, and the AF Method all implemented and activated. A user may set an imaginary straight line and walk on it. In some aspects, the user may set a destination, and map data used to generate a path, or the analysis system may integrate one or more Application Programming Interfaces (APIs). In some aspects, once the OD Method detects an obstacle, the actuator system may inform the user of the obstacle via the AF Method. When the user deviates from his walking path to avoid the obstacle, the PLN Method detects the deviation. It may activate the actuator system to inform the user of the deviation via the AF Method. Once the user returns to the imaginary straight line he sets, the actuator system is deactivated. The user continues to walk on this line till the OD Method detects another obstacle.

In some aspects, the SAAI Wearable systems and methods disclosed herein may implement a Power Management Method to manage the use of its battery according to the moving speed of a user.

In some aspects of the present disclosure, the above systems and methods are agnostic to wearable devices that existed before. For people with compromised vision, these systems and methods may allow them to detect obstacles, walk straight, and receive movement directions for a long time when they move.

FIG. 1A-C are illustrations of multiple views of a SAAI Wearable system 1000 depicting the structure that is wearable on a person's upper body, according to some aspects.

FIG. 1A is an illustration depicting the complete SAAI Wearable system 1000 according to some aspects.

FIG. 1B is an illustration depicting harness structure 600 of the SAAI Wearable system 1000 in FIG. 1A, according to some aspects.

FIG. 1C is an illustration depicting central package 700, which is enclosed in the harness of SAAI Wearable system 1000 in FIG. 1A according to some aspects.

As shown in FIG. 1A, SAAI Wearable system 1000 may comprise a sensor package 100, an analysis system 200, an actuator system 300, a signal transfer system 400, a battery 500, and a harness structure 600.

In some aspects, sensor package 100 can be formed by a carrier board 105 and one part of a mainboard 205. In some aspects, the sensor package 100 may host multiple types of sensors that collect signals including but not limited to sounds and electromagnetic waves from the surrounding environment and SAAI Wearable system 1000.

As shown in FIG. 1A, a sensor package 100 may host one or multiple ultrasonic sensors 101, Light Detection and Ranging (LiDAR) sensors 102, and Radar sensors 103 as well as an inertial measurement unit (IMU) 104 which may be located on different parts of the package. In some embodiments, the sensor package 100 may host a GNSS receiver capable of receiving position, navigation and timing from a GNSS constellation. In some aspects, the one or more ultrasonic sensors 101, Light Detection and Ranging (LiDAR) sensors 102, and Radar sensors 103 can be located on the carrier board 105, while the inertial measurement unit (IMU) 104 may be located on a mainboard 205.

In some aspects, a time-of-flight (TOF) sensor may include, but is not limited to, one or more ultrasonic sensors 101, LiDAR sensors 102, and Radar sensors 103 which can measure the distance between an obstacle and a sensor by measuring the flight time of signals to and from the sensor. In some aspects, the sensors may transmit sound and/or electromagnetic waves and receive feedback signals from the surrounding environment, and are suitable for collecting different types of feedback signals. Therefore, these sensors are good at detecting different types of obstacles under various situations. For example, ultrasonic sensors 101 are a cost-effective solution for detecting objects in environments with high levels of dust or humidity and perform better than infrared sensors when there is a lot of smoke. LiDAR sensors 102 can measure 3D structures and are generally unaffected by light. LiDAR sensors 102 have an extensive measurement range and are highly accurate. Small and fast-moving objects are generally detected well with LiDAR sensors 102. Radar sensors 103 can differentiate between inert obstacles and living obstacles through thermal measurements, so Radar sensors 103 are good at collecting signals that may inform a user whether an obstacle is a human being. Consequently, the combination of all of these different types of sensors using the detected signals help enable the user of the SAAI Wearable system 1000 for rapid navigation of the surrounding environment.

In some aspects, in addition to hosting TOF sensors, carrier board 105 also hosts sensor processors. These sensor processors convert signals in sound or electromagnetic waves to numerical values that the analysis system 200 receives via signal transfer system 400.

In some aspects, since sensors work closely with analysis system 200, for engineering efficiency, certain sensors can be physically installed on the same electrical board as analysis system 200. For example, as shown in FIG. 1A, IMU 104 can be mounted on mainboard 205, although the mainboard mainly hosts the analysis system 200.

In some aspects, IMU 104 comprises a 3D digital accelerometer, a 3D gyroscope, and a 3D digital magnetometer. The 3D digital accelerometer measures the acceleration rate a of the IMU 104. The 3D gyroscope measures the angular rate w of IMU 104 around any defined axis, such as x, y, or z axis. The number of accelerometers and gyroscopes within IMU 104 may vary depending on the type of sensors in order for the accelerometers to measure acceleration in relation to three coordinate axes and the gyros to measure angular velocity around three coordinate axes. The three coordinate axes represent 3-dimensional space, examples may include but are not limited to, a Cartesian coordinate system, Cylindrical coordinate system and Spherical coordinate system. In some aspects, a single-axis accelerometer can measure along a single axis, in which case at least three accelerometers would be needed to measure acceleration along three axes for 3-dimensional space. A three-axis accelerometer may measure along all three axes so only one may be needed. The same would apply to single-axis or three-axis gyroscopes. Some aspects of accelerometer types may include but are not limited to Microelectromechanical Systems (MEMS), resistive, capacitive, fiber optic, servo/force balance, vibrating quartz and piezoelectric. Examples of gyroscope types may include but are not limited to MEMS, ring-laser, fiber-optic, vibration and fluid. The magnetometer measures the magnetic field Φ of the IMU 104 with respect to the earth's frame magnetic field. When SAAI system is running, IMU 104 transfers the data measurements from the accelerometer, gyroscope and magnetometer to the analysis system 200 via the signal transfer system 400 for analysis system 200 to compute IMU 104's orientation, which represents the orientation of a person who wears IMU 104 incorporated SAAI Wearable system 1000.

According to some aspects, analysis system 200 can be hosted by mainboard 205. In some aspects, analysis system 200 may comprise one or more microcontrollers 201 and drivers 202. In some aspects, microcontrollers 201 can have artificial intelligence algorithms implemented to analyze signals from sensor package 100 and support different operation methods, such as OD and PLN Methods, of SAAI Wearable system 1000. After analysis, microcontrollers 201 may send their output to drivers 202, which send electrical current to actuator system 300 via signal transfer system 400. In some aspects, microcontroller's 201 output determines the frequency and power of the electrical current and decides which of the one or more actuators 301 receives the electrical current.

In some aspects, actuator system 300 comprises one or more actuators 301. In some aspects, analysis systems 200 transmit electrical signals to actuators 301 via the signal transfer system 400. In some aspects, actuators 301 have close or direct contact with one or multiple parts of a human body's surface to inform the human of positions and features of obstacles detected. In some aspects, one or more actuators 301 are attachable at different levels of a wearer. In some aspects, feedback from the actuators 301 corresponds to an obstacle's height. In some aspects, one or more actuators 301 include haptic actuators, which are one type of actuators capable of informing a user of SAAI Wearable system 1000 of obstacles' status by vibration. In some aspects, haptic actuators contact different parts of a human body to inform a user of an obstacles' position. In some aspects, an actuator contacting a user's middle breast may be mounted on a haptic actuator board 302 and informs a user of SAAI Wearable system 1000 of an obstacle at their breast level by vibration while another actuator contacting that user's upper breast may be mounted on a strap 622 of the harness system and inform them of an obstacle at their head level. In some aspects, one or more actuators 301 informs the user of the feature of an obstacle by changing its vibration frequency and power. For instance, an actuator may inform a user that an obstacle is a wall by vibrating at high frequency and high power. In some aspects, the different levels of actuators can inform the user of the SAAI Wearable system 1000 of an obstacle's height or other distinguishing properties about the obstacle.

In some aspects, signal transfer system 400 (illustrated by dotted lines in FIG. 1A) may comprise electrical connectors and wires. The signal transfer system 400 can enable the transfer of electrical signals between the sensor package 100, analysis system 200, and the actuator system 300. As shown in FIG. 1A, the signal transfer system 400 may connect the carrier board 105 with the mainboard 205. In addition, the signal transfer system 400 may also connect the mainboard 205 with the actuator interface board 401, the actuator system 300, and the battery 500. In some aspects, the actuator interface board 401 connects actuators 301 to drivers 202 located on the mainboard 205.

In some aspects, the battery 500 powers one or more electrical components of the SAAI Wearable system 1000. In some aspects, one or more electrical components may be powered using wireless power, such as magnetic resonance coupling, or by solar power, or by other means.

In some aspects, harness structure 600 comprises a front case cover 610, a sensor mounting structure 601, a back case cover 602, a body harness 620, a spider frame 603, and an end frame 604. In some aspects, the material of the front case cover 610 is resistant to stress and impact to protect the content embedded in front case cover 610 and the components under front case cover 610.

In some aspects, front case cover 610 has openings 611 for sensors to send and receive signals from the surrounding environment. Sensor covers 612 may cover over the openings 611 if needed. In some aspects, sensor covers 612 protect sensors from environmental factors that may damage the sensors or interfere with the sensors' functions. Such environmental factors may include, but are not limited to, stress, splashes, greases, and dust, so sensor covers 612 use different materials to protect and reduce noises to the sensors.

In some aspects, sensor mounting structure 601 is a frame that stabilizes the location of sensors. In some aspects, buttons 613 fit into the sides of front case cover 610 and control the switch between different method usage modes of the SAAI Wearable system 1000.

In some aspects, the shape of the back case cover 602 allows it to form an enclosed package with front case cover 610 and protect components inside the package. To work with a signal transfer system 400 comprising electrical wires and connectors, the back case cover 602 may include holes for electrical wires and connectors to come out of the package and connect with the remaining parts of an SAAI Wearable system 1000.

In some aspects, the front case cover 610, the sensor mounting structure 601, and the back case cover 602 form a package that supports and protects the sensor package 100 and analysis system 200.

In some aspects, the harness structure 600 comprises spider frame 603 and end frame 604 capable of forming a tight package with the back case cover 602 and protects haptic actuator board 302 of actuator systems 300.

In some aspects, as shown in FIG. 1A, body harness 620 connects all the components from 610 through 401 assembled in front of the body harness 620 and all the components from 603 through 604 assembled behind the body harness 620.

In some aspects, as shown in FIG. 1B, body harness 620 comprises a harness core 621, multiple straps 622, multiple elastic ribbons 623, and multiple actuator housings 624. This structure serves three functions. First, it fixes the central package 700 to the SAAI Wearable system 1000 at a specific body part, such as a breast. Second, it hosts and protects part of the actuator system 300 and part of the signal transfer system 400. In some aspects, actuator housings 624 hosts actuators 301. Actuators 301 may be connected with each other and with the rest of the SAAI Wearable system 1000 via part of signal transfer system 400 embedded in body harness 620. Third, the body harness 620 connects sensor package 100, analysis system 200, actuator system 300, signal transfer system 400, and battery 500 altogether.

In some aspects, as shown in FIG. 1C, front case cover 610 and back case cover 602 form a case with sensor package 100, analysis system 200, and battery 500 assembled inside the case to collect and analyze signals and data. In some aspects, end frame 604 forms a tight case with back case cover 602 and has an actuator interface board 401, harness core 621, spider frame 603, haptic actuator board 302 assembled inside the case. In FIG. 1C, components 610 to 604 are assembled together to form a central package 700 of SAAI Wearable system 1000.

In some aspects, parts of harness core 621 extend outside the tight case formed between back case cover 602 and end frame 604. In some examples, these parts connect with the body harness 620, so body harness 620 fixes the central package 700 to a user's body.

In some aspects, harness structure 600 fixes central package 700 to a visible part of the SAAI Wearable system 1000 user's body, decreasing the probability of the user's body blocking the sensors from detecting obstacles outside the user's body. In some examples, central package 700 is attached to a body part that is relatively steady or regularly moves to minimize the impact of an abrupt movement of body parts on the sensors' performance.

In some aspects, haptic actuator board 302 is flexible. It holds actuators and allows the vibration from actuators to transmit from SAAI Wearable system 1000 to the user. In some aspects, spider frame 603 is semi-rigid and blocks the transmission of vibration from actuators back to sensor package 100, protecting sensor package 100 from being interfered with by the vibration from haptic actuator board 302.

In some aspects, all the core components have holes carved inside them to allow electrical wires and connectors of signal transfer system 400 to go through and transmit electrical signals within SAAI Wearable system 1000.

In some aspects, SAAI Wearable system 1000 is implemented using multiple methods configured in microcontroller 201 to facilitate different modes of use. In some aspects, the SAAI Wearable may implement an Obstacle Detection (OD) Method, an Actuator Feedback (AF) Method, a Path-Line Navigation (PLN) Method, and a Power Management (PM) Method.

In some aspects, the OD Method is always activated. The OD Method allows SAAI Wearable system 1000 to analyze feedback signals from environmental obstacles via TOF sensors (101, 102, and or 103) on carrier board 105. In some examples, signals are processed by sensor processors incorporated in TOF sensors and obstacle detection algorithms integrated with a microcontroller 201 on mainboard 205. In some examples, the output of the sensor processors, which may be a set of numerical values, are subsequently evaluated by the obstacle detection algorithms to determine whether or not an object is classified as an obstacle. In some examples, the output is used by AF Method to warn the user of the obstacle so the user can avoid it.

In some aspects, the AF Method is always activated, and it can work with other methods such as an OD Method. For example, the output of an OD Method can be sent to drivers 202 located on the mainboard 205. Drivers 202 can then send out electrical currents to activate the actuator system 300, informing the user of the SAAI Wearable system 1000 of obstacles in the surrounding environment and consequently help to guide the user to move safely. The AF Method may combine different ranges of vibration frequencies and power in a different sequence to represent different obstacles. For example, the combination sequence of vibration frequencies and power for a wall is different from that for a person or a car. Vibration patterns may include, but are not limited to, different numbers of consecutive vibrations to represent a different obstacle. For example, a car may have a different number of vibrations than a wall.

In some aspects, the user of SAAI Wearable system 1000 may choose to activate the PLN Method by controlling buttons 613 on front case cover 610. The PLN Method may work with the OD Method and the AF Method to help a user of SAAI Wearable system 1000 walk along a straight line or other path. With PLN mode, both the PLN Method and OD Method incorporate their respective algorithms into a microcontroller 201 on mainboard 205. The PLN Method allows a user to establish an imaginary line in front of the user while the OD Method detects objects, which may include obstacles. As discussed herein, an object that negatively impacts the user of the SAAI Wearable system 1000 is an obstacle. Examples of objects that are obstacles may include but are not limited to, objects in the walking path of the user or objects that may collide with the user of the SAAI Wearable system 1000. If the OD Method detects an object on the imaginary line, microcontroller 201 sends its output to drivers 202 warning the user of SAAI Wearable system 1000 to avoid the obstacle via the AF Method. In some examples, the PLN Method is programmed to help the user to avoid the obstacle by deviating his preset imaginary straight line. In some examples, the PLN Method detects the deviation and notify the user of his deviation via the AF Method. In some examples, with the PLN Method, the actuators are active until the user moves back to his preset path, so the PLN Method may help the user return after avoiding the obstacle. In some examples, paths may include curved lines or other shapes. In some examples, paths may include points set along a walkway or geotagged locations. In some aspects, map data may be used to generate a path, and the analysis system may integrate one or more APIs such as a geolocation, mapping, and navigation applications including but not limited to GOOGLE MAPS, APPLE MAPS, WAZE, and/or the like and/or combinations thereof. In some aspects, the analysis system may interact with a map or a geographic information system (GIS) database through a map API such as the GOOGLE MAPS API.

In some aspects, the PM Method is an energy-saving method. The PM Method manages the use of power and avoids rapid energy consumption using activity recognition algorithms. This activity recognition algorithm may use the accelerometer data measured by IMU 104 on x, y, and z axes to recognize the activity levels (e.g., number of steps the SAAI Wearable system 1000 user has taken) of the SAAI Wearable system 1000 user using fast Fourier transform ("FFT"), frequency response peak identification, and Power Spectral Density ("PSD"), and the raw acceleration data from IMU 104. In some examples, the activity recognition algorithm estimates the velocity with a machine learning model which classifies a user's activity into different scenarios, such as idle, walking, and running. In some examples, the machine learning model comprises an artificial neural network that is trainable to identify different activity scenarios. The number of inputs to the artificial neural network is equal to four times the size of the information window for the raw data and their FFT plus PSD data plus peak frequencies of the FFT. The outputs are different activity scenarios such as idling, walking, and running. In some examples, the PM Method adjusts the energy use of an SAAI Wearable system 1000 according to the output of the machine learning model, i.e., the moving speed of the user. In some examples, the faster the user moves, the more energy the battery releases. In some aspects, when the user doesn't move, the PM Method may temporarily disable SAAI wearable system 1000. Some advantages of the disclosed aspects may include but are not limited to extending battery life, promoting efficient power use, and more accurate tracking of movement.

In some aspects, a machine learning model may be trained/tuned based on training data collected from positive recognition, false recognition, and/or other criteria. In some aspects, the ML model may be a deep neural network, Bayesian network, and/or the like and/or combinations thereof. Although various types of ML models may be deployed to refine some aspects for identifying whether a listing location is occupied or not, in some aspects, one or more machine learning classification algorithms may be used. Such classifiers may include but are not limited to: MobileNet object detector, a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the machine learning models may be configured to perform various types of regression, for example, using one or more various regression algorithms, including but not limited to: Stochastic Gradient Descent Regression, and/or Passive Aggressive Regression, etc.

In some aspects, a machine learning model may be trained in a virtual environment. In some aspects, training in a virtual environment enhances a model's focus through reinforcement learning on certain visual data or scenarios which may occur infrequently. This enables the ML model to account for edge cases (that may be based on real scenarios) that a model with less training may perform inaccurately when encountering the same or a similar scenario to such edge cases. In some aspects, a virtual environment may be a 3D model of an environment within which batches of random simulations are performed. In some aspects, the training may be performed by one or many persons via augmented reality. In some aspects, there may be unsupervised learning in which the ML model learns, for example, online and without data having been previously viewed.

Figure 2:
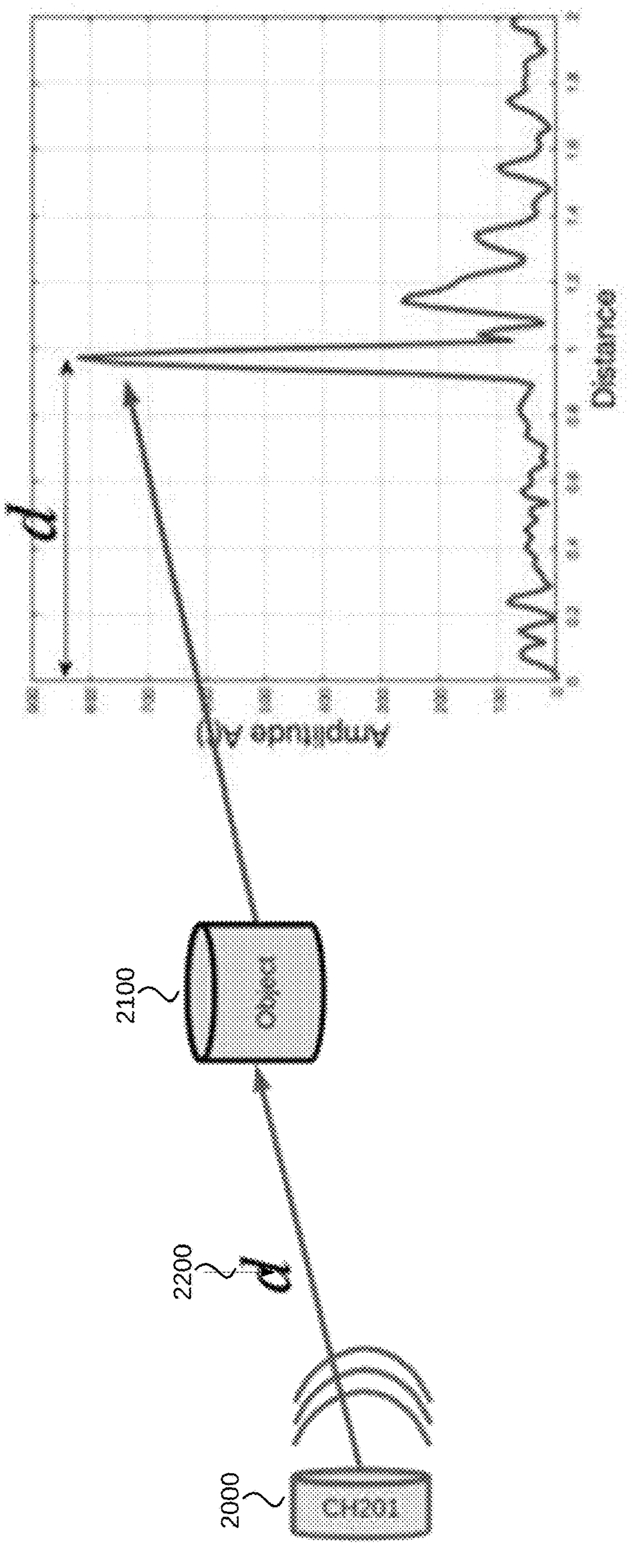
FIG. 2 is a schematic diagram illustrating how an example TOF sensor detects an obstacle and calculates the distance between the obstacle and the TOF sensor.

FIG. 2 is a schematic diagram illustrating how an example TOF sensor 2000 detects an obstacle 2100 and calculates the distance 2200 between the obstacle 2100 and the TOF sensor 2000.

In some aspects, the TOF sensor 2000 sends ultrasound or electromagnetic waves to a surrounding environment via its emitter. When the waves hit an obstacle, the waves bounce back and may be received by the TOF sensor's 2000 receptor. The receptor may convert the waves' energy to an electrical current, allowing the TOF sensor 2000 to measure the time difference between wave emission and reception. The time difference is called time of flight, or TOF. In some examples, using the TOF sensor's 2000 incorporated sensor processor calculates the distance between the sensor and the obstacle. In some aspects, TOF sensors 2000 include but are not limited to ultrasonic sensors, radar sensors, and LiDAR sensors.

FIG. 2 illustrates how an ultrasonic sensor detects the distance between an obstacle and the sensor. Other TOF sensors 2000 use similar means to measure the distance.

As described above, an ultrasonic sensor is an electronic device that measures the distance of a target obstacle by emitting ultrasonic sound waves and converts the reflected sound waves into electrical signals. An ultrasonic sensor has two main components: a transmitter, which emits sound waves using piezoelectric crystals, and a receiver, which receives the sound waves after they have traveled to and from a target. In comparison to infrared (IR) sensors in proximity sensing applications, ultrasonic sensors are not as susceptible to interference of smoke, gas, and other airborne particles.

In some aspects, one type of ultrasonic sensor, a CH201 sensor, can be used by an SAAI Wearable system 1000 to detect obstacles as described above. A CH201 sensor is a miniature, ultra-low power, and long-range ultrasonic TOF sensor 2000 based on Chirp's MEMS-based patented technology. The sensor integrates a Piezoelectric Micromachined Ultrasonic Transducer (PMUT) with an ultra-low-power System on Chip (SoC) in a miniature, reflowable package. A CH201 sensor is fast because it uses sound velocity and provides accurate range measurements to targets at distances up to 5 meters. In some examples, a CH201 sensor detects multiple obstacles and works in any lighting conditions, including full sunlight, and provides millimeter-accurate range measurements.

In some aspects of an OD Method, the microcontroller 201 implements a peak detection algorithm to analyze returning TOF data collected by ultrasonic sensors. The TOF data, referred to as an Amplitude-Scan (A-Scan), contains the TOF and amplitude of each returning echo. A reflecting obstacle sends back high amplitude A-Scan data to the sensor. In some aspects, the TOF sensor 2000 and microcontroller 201 (as shown in FIG. 1A) are connected with an external host system. In some examples, the external host system plots a chart as shown in FIG. 2 with the x-axis representing the distance (d) between the location of the obstacle and the sensor and the y-axis representing the amplitude of the signal. The larger the amplitude, the more likely it is a real obstacle rather than background noise.

FIG. 3 shows an example peak detection algorithm 3000 illustrating an example means of deciding peaks that represent obstacles in signals collected by a TOF sensor.

In some aspects, peak detection algorithm 3000 measures the standard deviation of background signals as the TOF sensor moves. In some examples, peak detection algorithm 3000 calculates and tracks a moving average of the amplitude of background signals. The moving average creates a moving baseline which corrects the difference in background noise as the TOF sensor moves. When the TOF sensor detects a signal whose amplitude is larger than a certain number of standard deviations away from the moving average, this signal is deemed as a peak by the algorithm.

In the example peak detection algorithm 3000 shown in FIG. 3, the peak detection algorithm 3000 compares the value of each signal data point to the average value of preceding points. The number of preceding points is decided by the value of a parameter called "lag." Trial-and-error experiments decide the value of lag during product development. A set of "th" variables in the peak detection algorithm 3000 is used to make more reliable comparisons with reality; this is because the CH-201 TOF sensor has a larger amplitude value as the object is closer. As shown in FIG. 3, the value of index can fall between different ranges for different regions and the measurements are compared to determine if it is a near or distant peak. The further away the object is, the lower the value of "th"; conversely, the closer an object is, the higher the value of "th". In this way, SAAI Wearable system 1000 detects objects that are even further away from it and detects several objects within its angle of vision. In some aspects, peak detection algorithm 3000 corrects the average value of the preceding points by a parameter called "influence." The value of "influence" is decided by the expected amplitude of obstacles. The larger the amplitude of an obstacle, the smaller the value of influence. A signal is deemed a peak that represents an obstacle when its amplitude is larger than a certain number of standard deviations. The value of "threshold" determines the number of standard deviations. The value of "threshold" was selected by taking samples from 10,000 trials. The mean of these measurements and the standard deviation are the performance indicators for proposing the "threshold" value. When the difference between the amplitude of a signal and the moving average is more than the result of the standard deviations of background noise multiplied by the "threshold", peak detection algorithm 3000 determines it is a signal for an obstacle. In some aspects, if the amplitude of the signal is less than this calculated value, then it is still considered noise.

Figure 5:
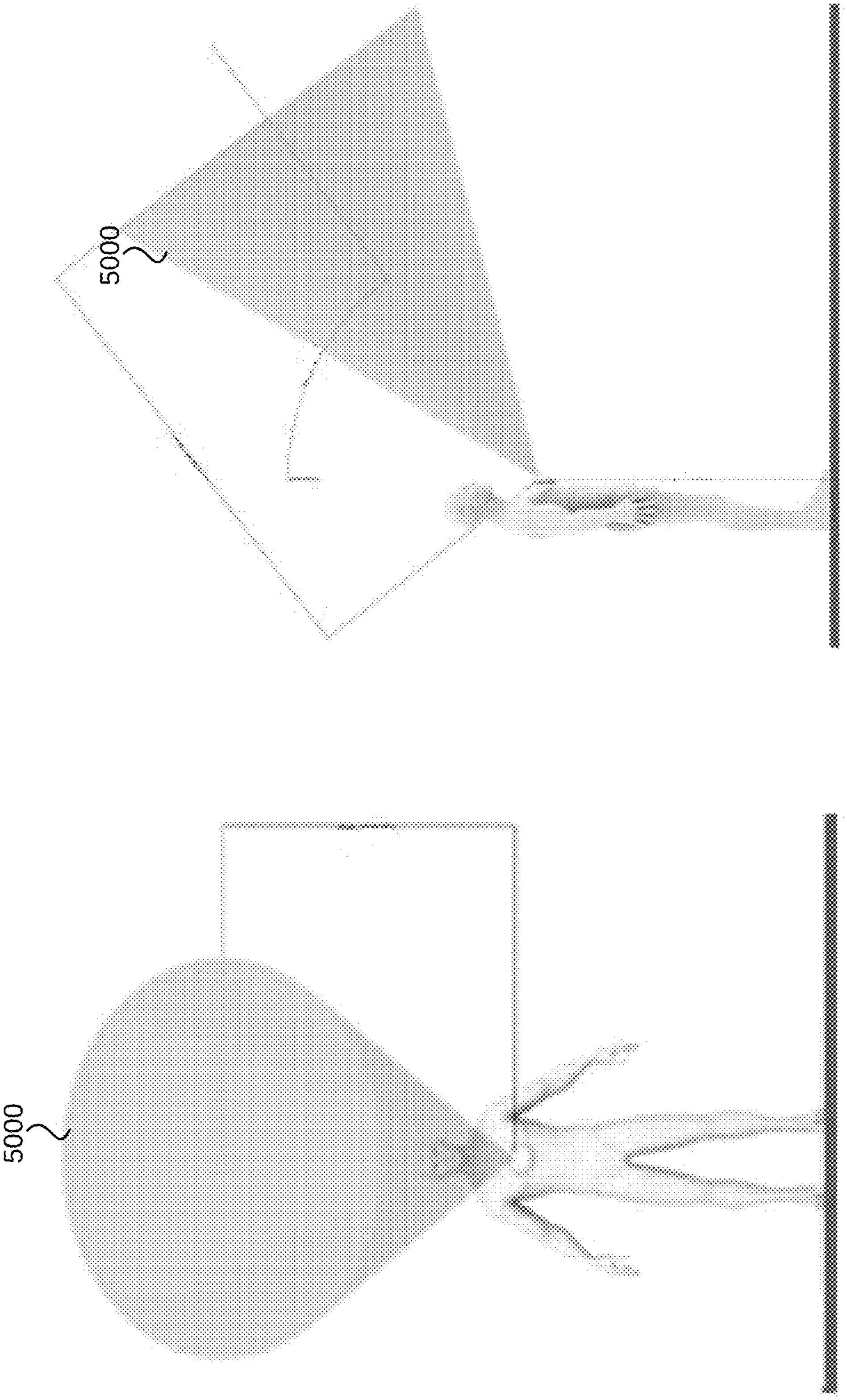
FIG. 5 is an illustration of a TOF sensor detection angle range for obstacles located at a person's upper body level.

In some aspects, for an OD Method to detect obstacles at different levels, sensors are placed on different locations of sensor package 100 and at different angles compared to the vertical direction, as discussed in further detail in FIG. 5.

Figure 4:
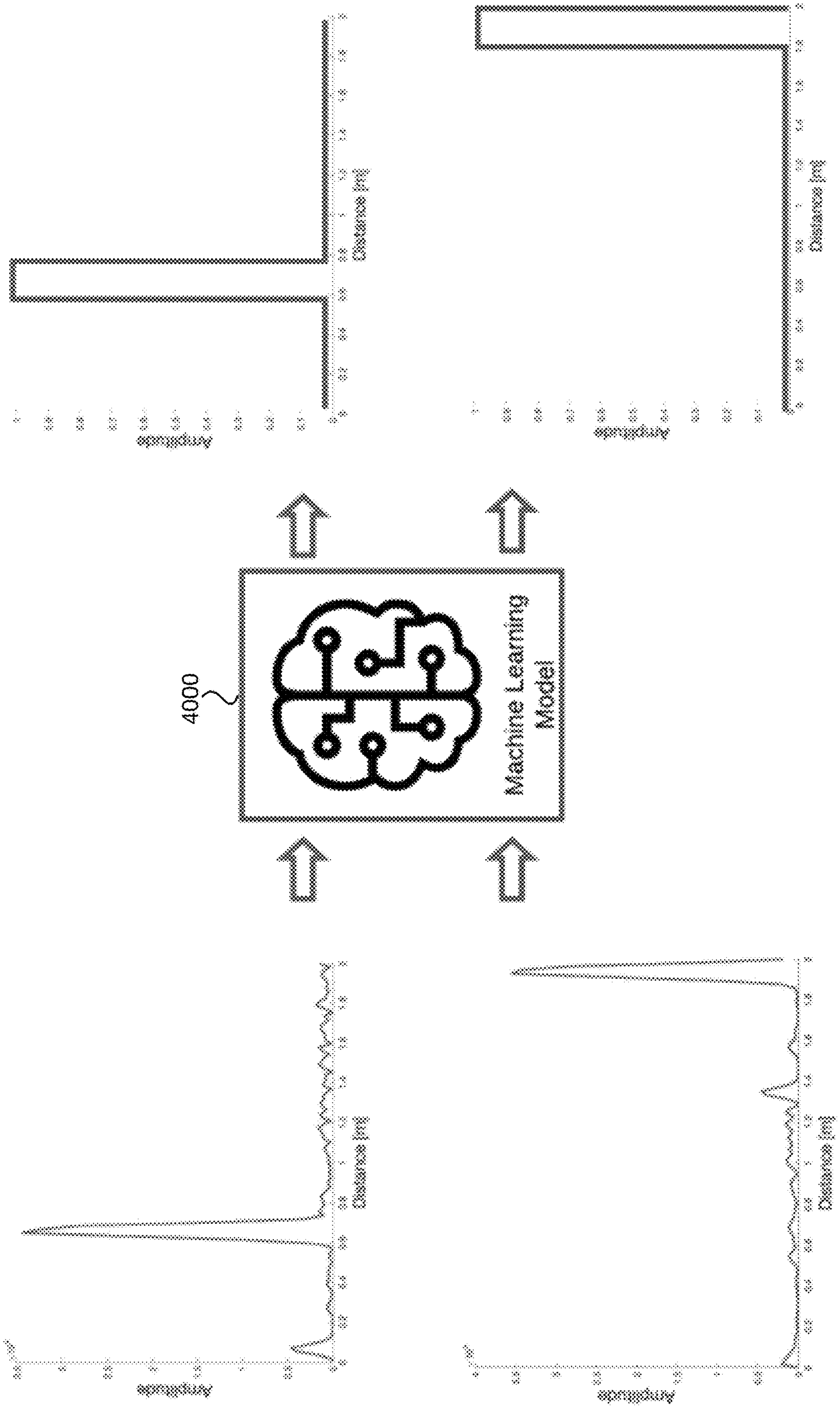
FIG. 4 shows an input and output representation of how a ML model learns and detects the peaks from TOF sensor measurements.

FIG. 4 shows an input and output representation of how a ML model 4000 learns and detects the peaks from TOF sensor measurements.

The A-Scan signal shown in FIG. 4 may be processed through information windows of W number of samples, where each window corresponds to a value as an output variable. In this particular case, it may only have 0 as an output signal when there is no peak detection and 1 when a peak has been detected. Therefore, if there is a window where no peak is found, the machine learning model can learn that and it sends a zero where it has not been able to detect a peak (i.e., the machine learning model has not detected an obstacle). On the other hand, if the window contains small parts corresponding to a peak or literally a peak, the machine learning model returns a 1 that represents a detection of a peak.

Once the model has been trained, it is evaluated through dynamic windows. The same windowing technique is used where W is a large number, if this window finds a detection, its width is reduced in order to obtain several safer detections and reduce the rate of false positive detections.

In some aspects, in addition to the first peak detection algorithm as discussed above in FIG. 3 and in order to ensure that the detection of objects by ultrasonics does not give false positives in the detection of these peaks, SAAI Wearable system 1000 has a second peak detector that allows it to reinforce the reading or location of objects. This methodology is based on a ML model where it uses the reading of the sensor in its A-Scan configuration and whose output is the peak detector. FIG. 4 represents how the machine learning model obtains the data and what its output would be in the cases of detection or non-detection. It is important for the SAAI Wearable system 1000 to get the real readings related to the obstacles. In some aspects, SAAI Wearable system 1000 has two peak detections for the TOF sensor measurements and the SAAI Wearable system 1000 has a filter responsible for determining a true peak detection. Once a peak has been detected, the output of the peak detection algorithm is responsible for obtaining the width of the peak or its duration, just as in the Machine Learning model. Although there are two different ways of representing a potential obstacle, the TOF sensors are still susceptible to noise, that is, noise due to their hardware and not due to sound noise. In some aspects, SAAI Wearable system 1000 counts the duration of the detection by counting permutations subsequent to a detection, that is, once an object is detected, it counts the number of subsequent samples that the object continues to be identified. In some aspects, when the detection is maintained, this indicates the presence of an obstacle in the environment.

FIG. 5 is an illustration of a TOF sensor detection angle range for obstacles located at a person's upper body level. As shown in FIG. 5, cone 5000 angle represents the detection range of the TOF sensor. For example, some obstacles such as traffic signs, branches, and restaurant signs are located at a person's upper body level. As discussed above in FIG. 1A, for a sensor package 100 to detect such obstacles, one or more sensors on the sensor package 100 should be situated on the front of the person wearing the sensors with an angle to horizon level within a range of 14.5° to 75.5° to the vertical direction.

Figure 6:
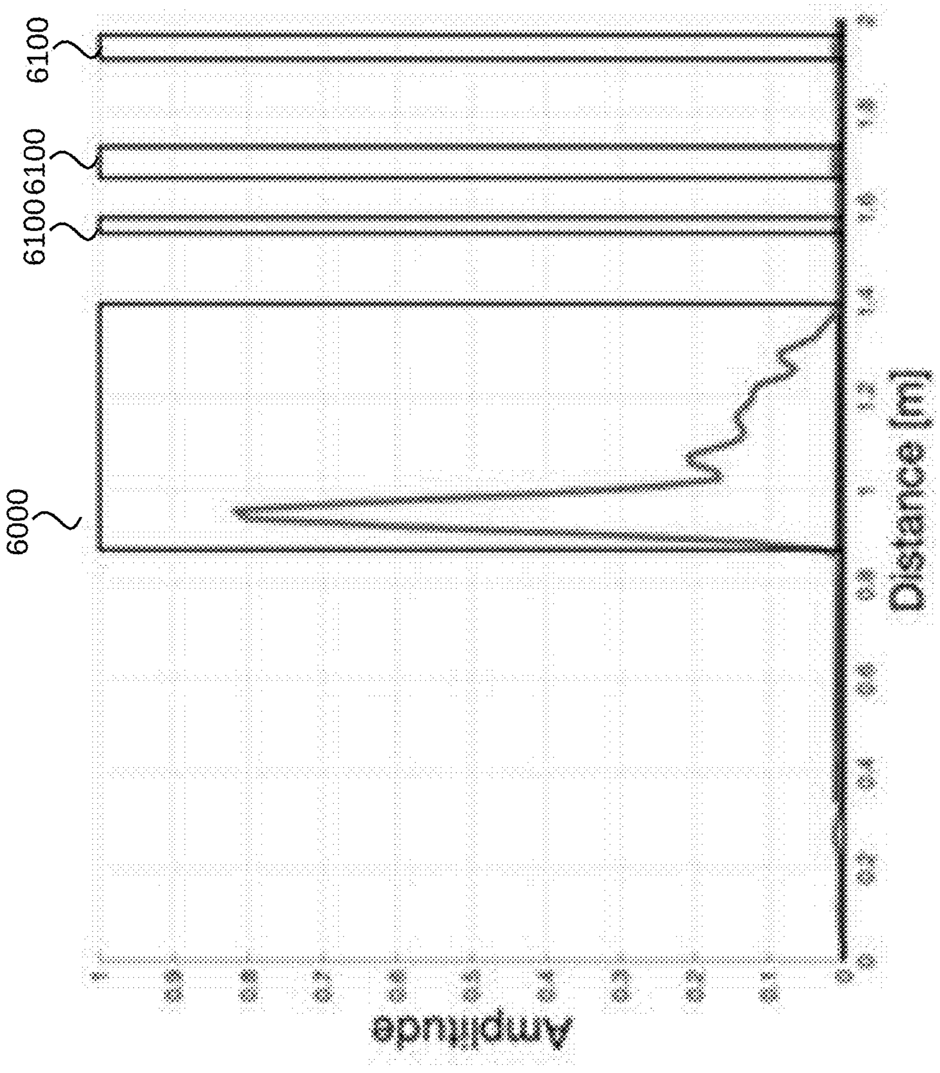
FIG. 6 is a graph of the relationship between distance and amplitude based on an example output of the OD Method applied to obstacles at a person's middle body level.

FIG. 6 is a graph of the relationship between distance and amplitude based on an example output of the OD Method applied to obstacles at a person's middle body level. The single peak 6000 as shown on the graph represents an obstacle that is detected by the SAAI Wearable system 1000 while the three peaks 6100 are noise. Some obstacles, such as people, cars, and benches, are located at a person's middle body level. For a sensor package 100 to detect such obstacles, one or more sensors should be situated on the front of the user of the SAAI Wearable system 1000 with an angle within a range of 47.5° to 132.5° to the vertical direction.

Figure 7:
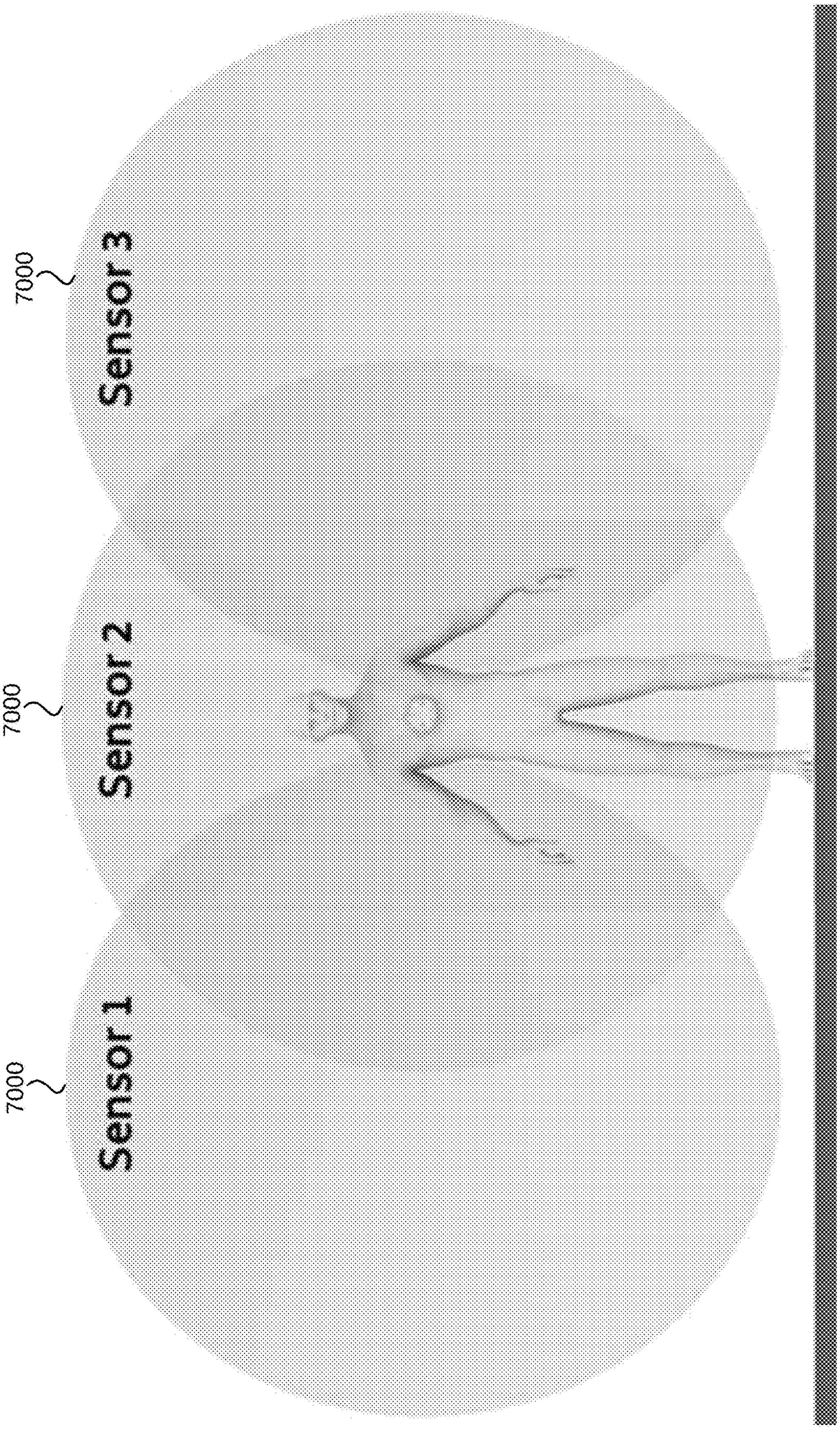
FIG. 7 is an illustration of an example obstacle detection range when the OD Method uses multiple TOF sensors to detect obstacles at an SAAI Wearable system user's middle body level.

FIG. 7 is an illustration of an example obstacle detection range 7000 when the OD Method uses multiple TOF sensors to detect obstacles at an SAAI Wearable system 1000 user's middle body level. In some aspects, the OD Method may use multiple TOF sensors to detect obstacles at an SAAI Wearable system 1000 user's middle body level in different areas. In some aspects, a combination of three ultrasonic sensors are used to detect obstacles at an SAAI user's middle body level. The sensors' angles are adjusted such that one sensor detects obstacles on the user's right side. In some examples, an additional sensor detects obstacles over the central part of the user, while another sensor detects obstacles on the user's left side. The closer an obstacle to a sensor, the larger the signal amplitude that can be detected by a sensor.

In some aspects, for an obstacle located at a specific position in the SAAI Wearable system 1000 user's surrounding environment, the three ultrasonic sensors receive signals of different amplitudes. The sensor closest to the obstacle receives signals with the largest amplitude. The sensor farthest from the obstacle receives signals with the smallest amplitude. In some aspects, the obstacle is outside the detection range of the farthest sensor and this sensor receives no signals.

Figure 8:
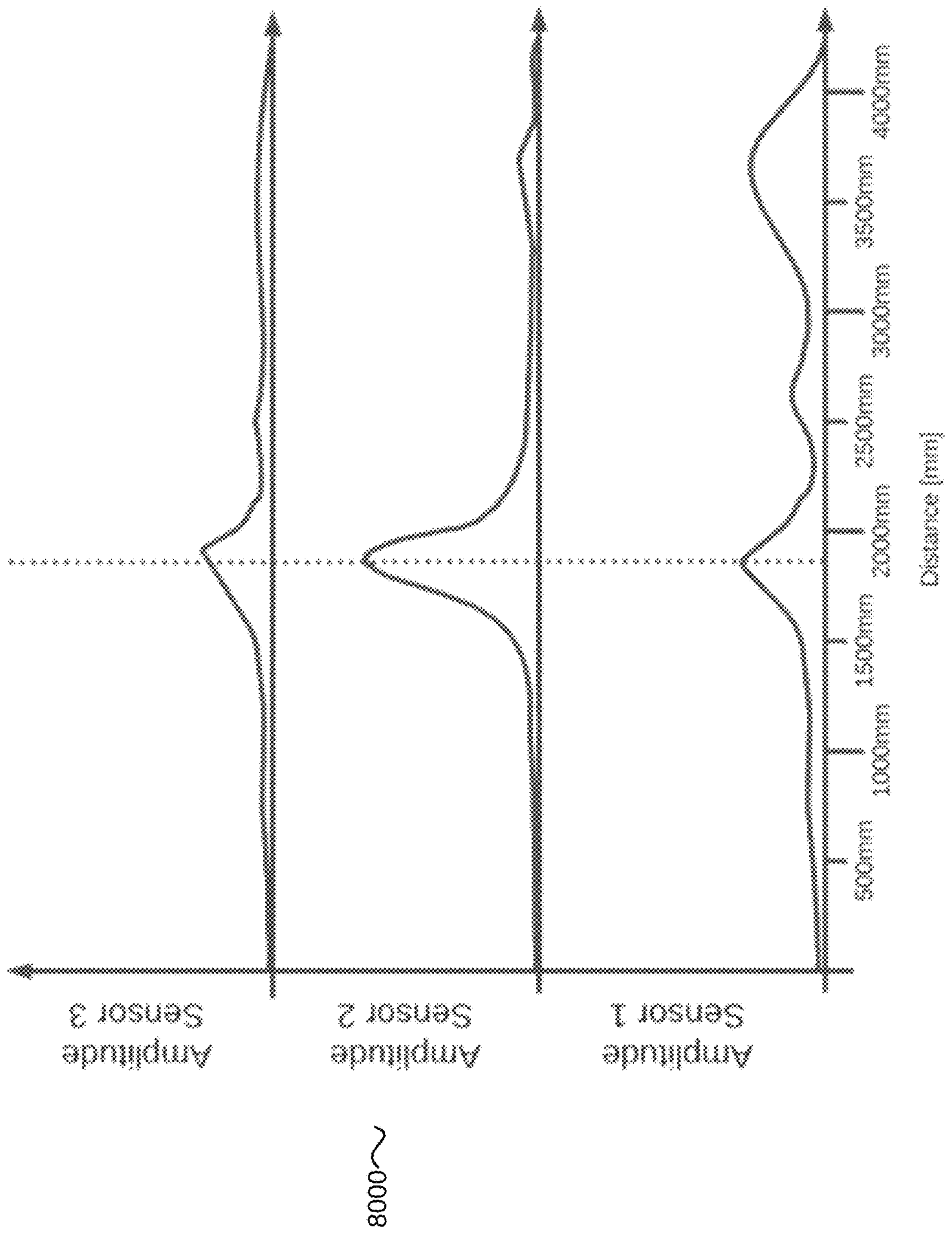
FIG. 8 shows example detection results of a sample obstacle located at 1.75 meters in front of TOF sensor 2 as shown in FIG. 7.

FIG. 8 shows example detection results 8000 of a sample obstacle located at 1.75 meters in front of TOF sensor 2 as shown in FIG. 7.

As shown in FIG. 8, for the same obstacle, the signal received by sensor 2 has the largest amplitude because sensor 2 is the closest to the obstacle. The signal received by sensor 1 has the second-largest amplitude because sensor 1 is further from the obstacle compared to sensor 2, but closer to the obstacle compared to sensor 3. The signal received by TOF sensor 3 has the smallest amplitude because TOF sensor 3 is the farthest from the obstacle.

In some aspects, sensor processors may analyze the signals from the obstacle using the peak detection algorithm disclosed above to determine the distances between the obstacle with respect to each sensor. In some examples, with the OD Method activated, microcontroller 201 (as shown in FIG. 1A) on the mainboard 205 analyzes the distances and locates the closest obstacle. Once the closest obstacle is detected, microcontroller 201 analyzes a number of samples (e.g., 30 samples) to decide whether there is a displacement of the obstacle. The maximum peak found is assigned a value of 100%, and other peaks' values are set as specific percentages of the maximum peak. In some examples, microcontroller 201 then locates the TOF sensors (e.g, ultrasonic sensors) that receive the two largest feedback signal amplitude peaks of the same obstacle and compare the magnitudes to decide the obstacle's location relative to the three TOF sensors. In some examples, once the obstacle's location is decided, microcontroller 201 stimulates drivers 202 using an electrical current at a specific predefined combination of power and frequency. In some examples, drivers 202, in response to signals from microcontroller 201, notifies the user of SAAI Wearable system 1000 of the obstacle's location by activating actuator system 300 at the corresponding power and frequency.

Figure 9:
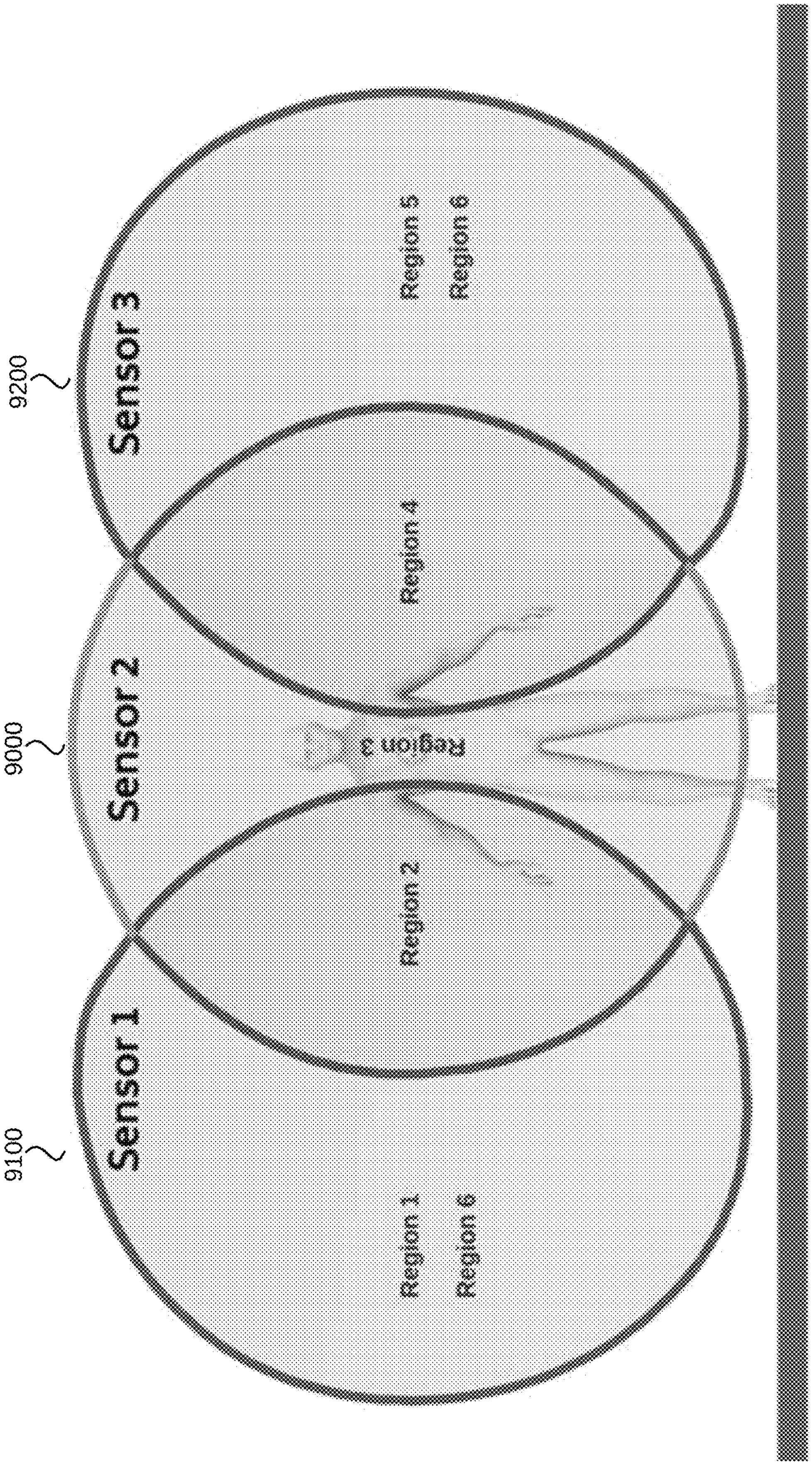
FIG. 9 is an illustration of how the SAAI Wearable system splits its object detection zones.

FIG. 9 is an illustration of how SAAI Wearable system 1000 splits its object detection zones in order to have a highly accurate localization of an object.

According to some aspects, as shown in FIG. 9, the 3 TOF sensor object detection ranges are illustrated as 9100 for TOF sensor 1, 9000 for TOF sensor 2, and 9200 for TOF sensor 3. As discussed above, the 3 TOF sensors are located in SAAI Wearable system 1000 as worn by a user. In some examples, detection area covered by the three TOF sensors is divided into 6 regions, as shown in FIG. 9. In some examples, using the OD Method described under FIG. 8, if TOF sensor 1 and TOF sensor 2 receive the strongest signals from an obstacle and the signal amplitude received by TOF sensor 2 is stronger than that of TOF sensor 1, then microcontroller 201 generates an electrical current of specific predefined power and frequency informing the SAAI Wearable user that the obstacle is in region 2 shown in FIG. 9.

Figure 10:
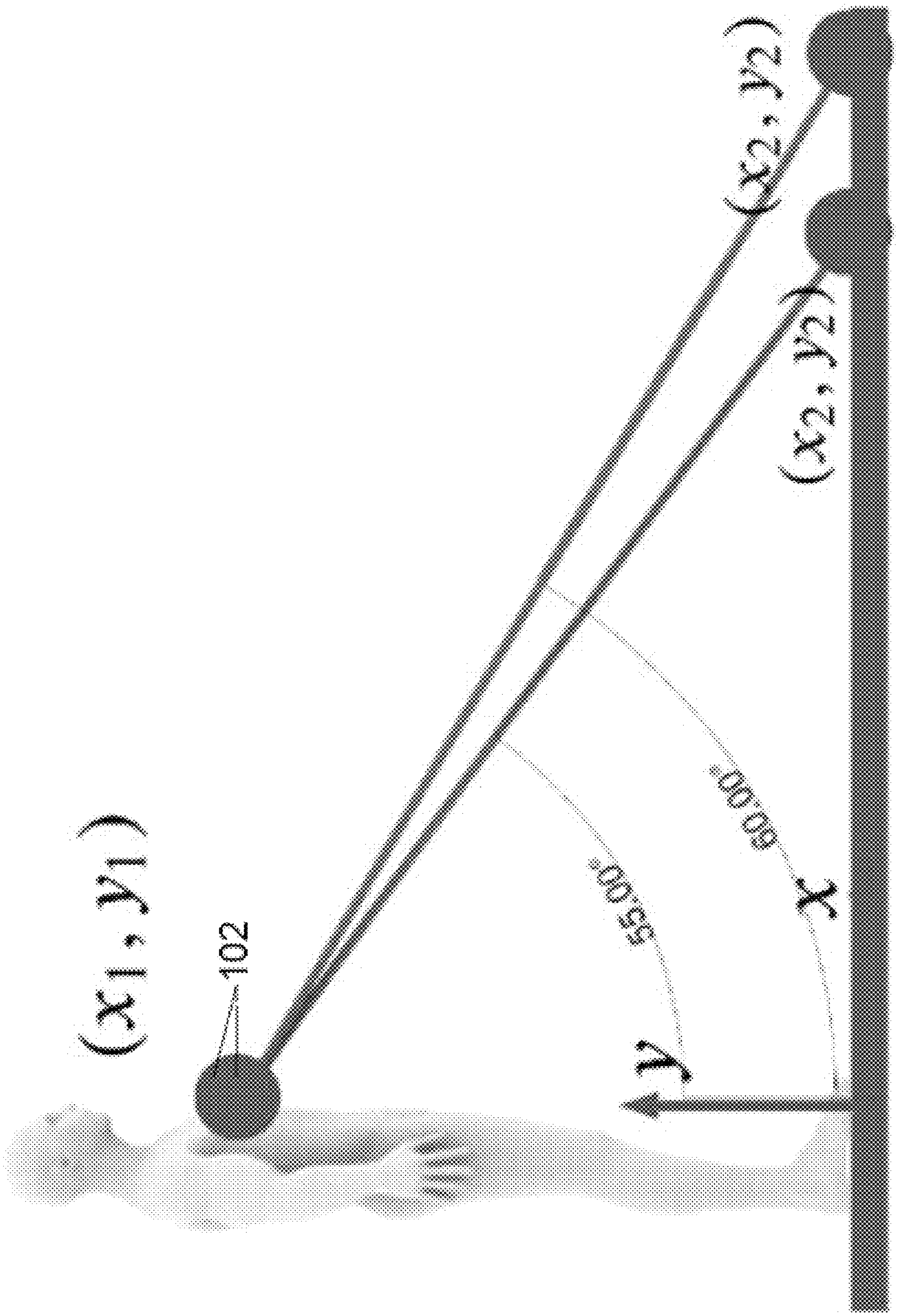
FIG. 10 is an illustration of an example algorithm implemented in a microcontroller for an OD Method to detect obstacles' shape features at a person's lower body level using multiple sensors.

FIG. 10 is an illustration of an example algorithm implemented in a microcontroller for an OD Method to detect obstacles' shape features at a person's lower body level using multiple sensors.

In some aspects, obstacles which may include but are not limited to stairs, holes, and objects on the road, may be located at a person's lower body level. For sensor package 100 to detect such obstacles, one or more sensors should be situated at the bottom of sensor package 100.

In some aspects, two LiDAR sensors 102 are mounted at the bottom of sensor package 100 at different angles to the vertical level. Both LiDAR sensors 102 give microcontroller 201 information about the distance between sensors and floor as well as the distance between sensors and an obstacle using coordinates $(x_1, y_1)$ and $(x_2, y_2)$ as shown in FIG. 10, where here $(x_1, y_1)$ are the coordinates from the first LiDAR sensor and $(x_2, y_2)$ are the coordinates from the second LiDAR sensor. Under the OD Method, microcontroller 201 may apply the following equation to calculate the slope of an imaginary straight line generated by the relation between the coordinates $(x_1, y_1)$ and $(x_2, y_2)$ in FIG. 11. The slope of the imaginary straight line in FIG. 11 represents the shape of an obstacle on the ground level.

$$y - y_1 = \frac{y_2 - y_1}{x_2 - x_1}(x - x_1),$$

Figure 11:
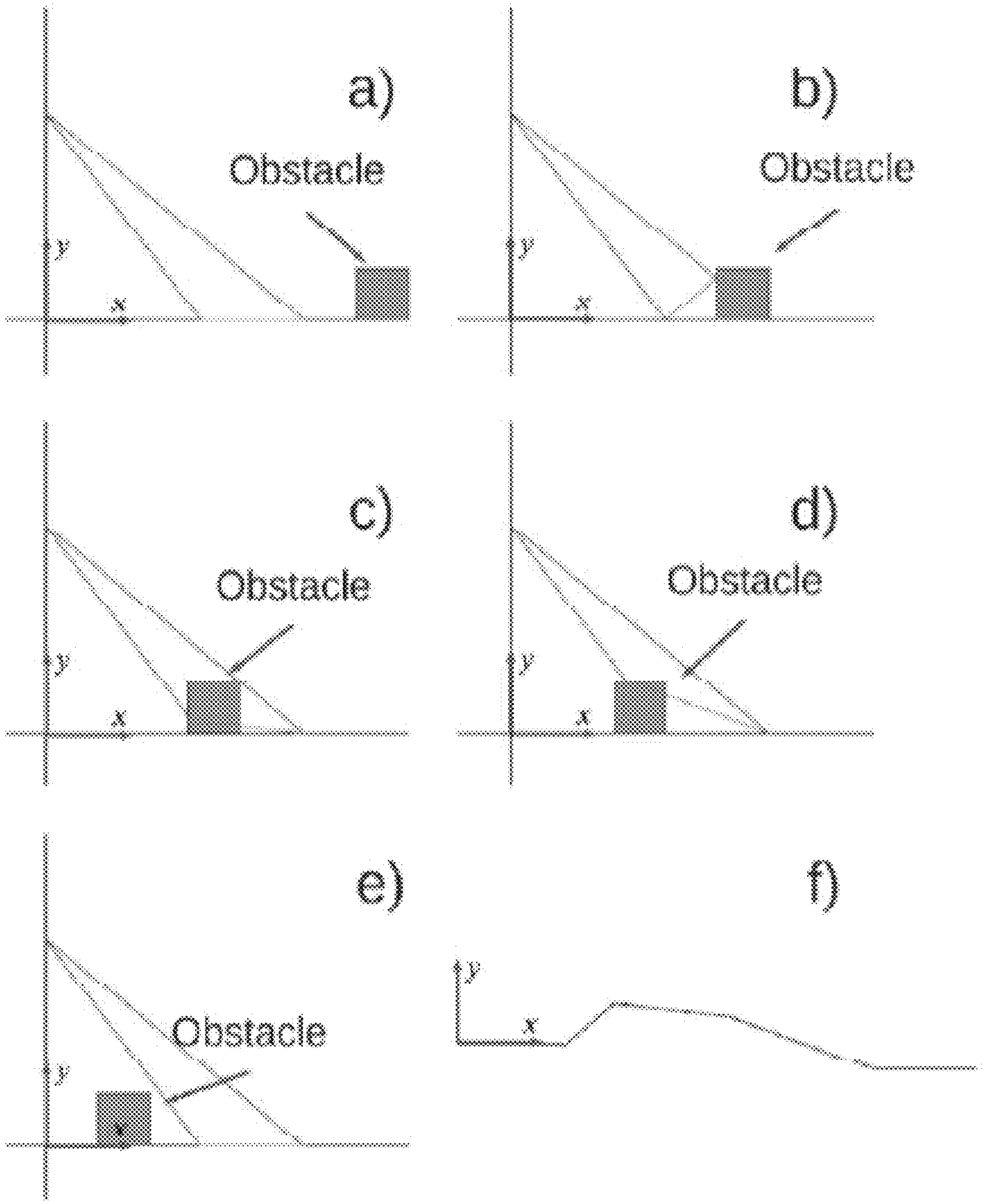
FIG. 11 is an illustration of a microcontroller measuring the shape of an obstacle as LiDAR sensors move towards a square-shaped obstacle on the ground and pass it.

FIG. 11 is an illustration 11000 of a microcontroller measuring the shape of an obstacle as LiDAR sensors move towards a square-shaped obstacle on the ground and pass it.

As shown in FIG. 11, when LiDAR sensors 102 move towards a square-shaped obstacle on the ground and pass it, the microcontroller 201 applies the straight equation shown above to calculate the slope of the straight line generated by the coordinates at continuous time points from FIGS. 11(*a*) to 11(*e*). Such measurements, when plotting on a chart with the slope of the imaginary straight line as y-axis and the moving time points as x-axis, form a pattern in FIG. 11(*f*) that is specific to the shape of the obstacle. In the device design industry, instead of using FIG. 11(*f*) to represent the shape of an object, we often use a matrix in FIG. 12 to represent the shape which facilitates the subsequent classification of the shapes with artificial intelligence.

Figure 12:
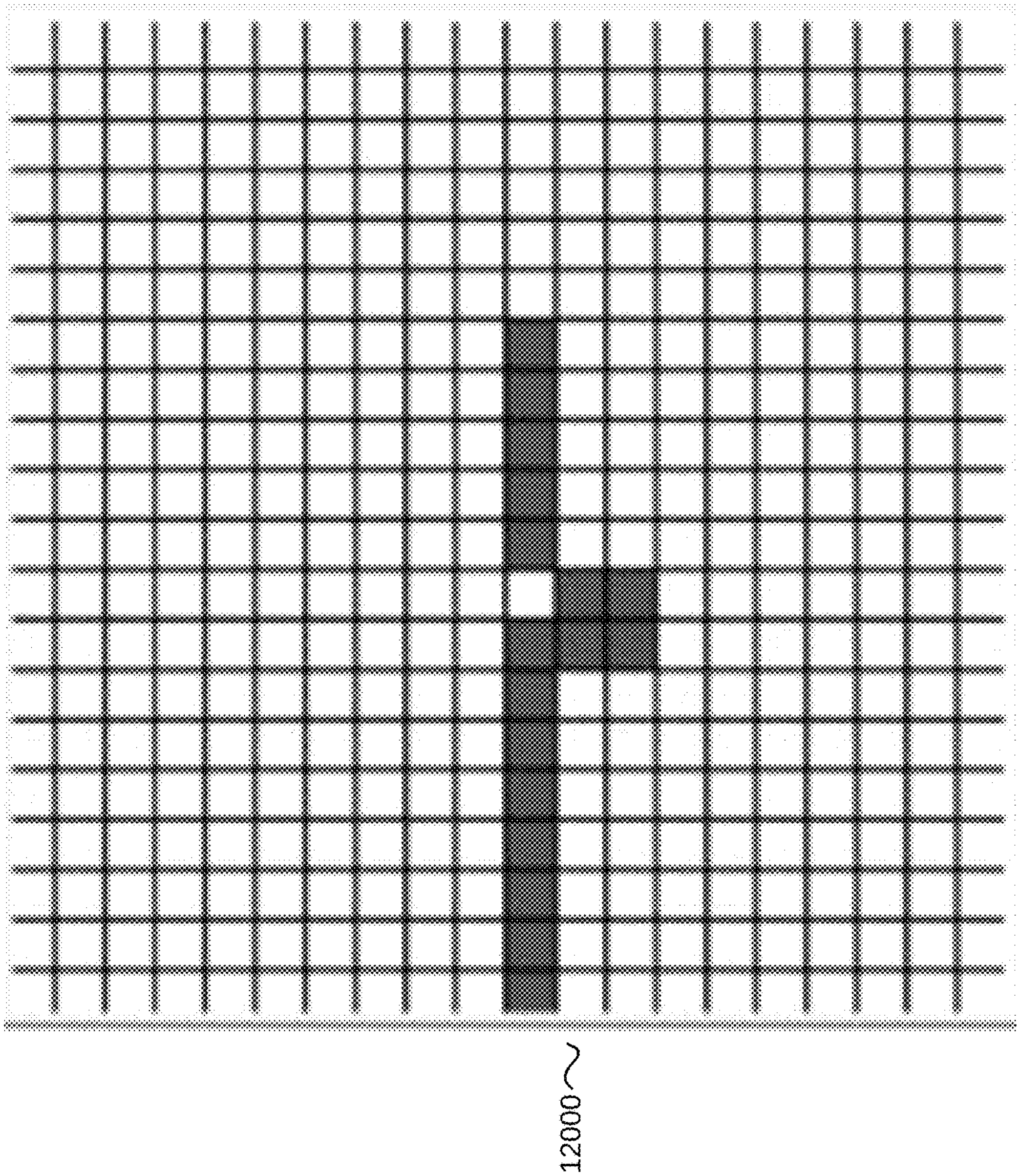
FIG. 12 is an example matrix that illustrates the shape of the example obstacle detected in FIG. 11 in an example OD Method.

FIG. 12 is an example matrix that illustrates the shape of the example obstacle detected in FIG. 11 in an example OD Method.

The microcontroller 201 transforms the data in FIG. 11 into a 20×20 image matrix 12000, where $X \in R^{20\times20}$. In some aspects, microcontroller 201 uses each pixel of the image element of this matrix as an input of an artificial neural network ("ANN"). The pixels with the shaded area have a one in its index, while the pixels without a shade have a zero. This is discussed in greater detail in FIG. 13 below.

Figure 13:
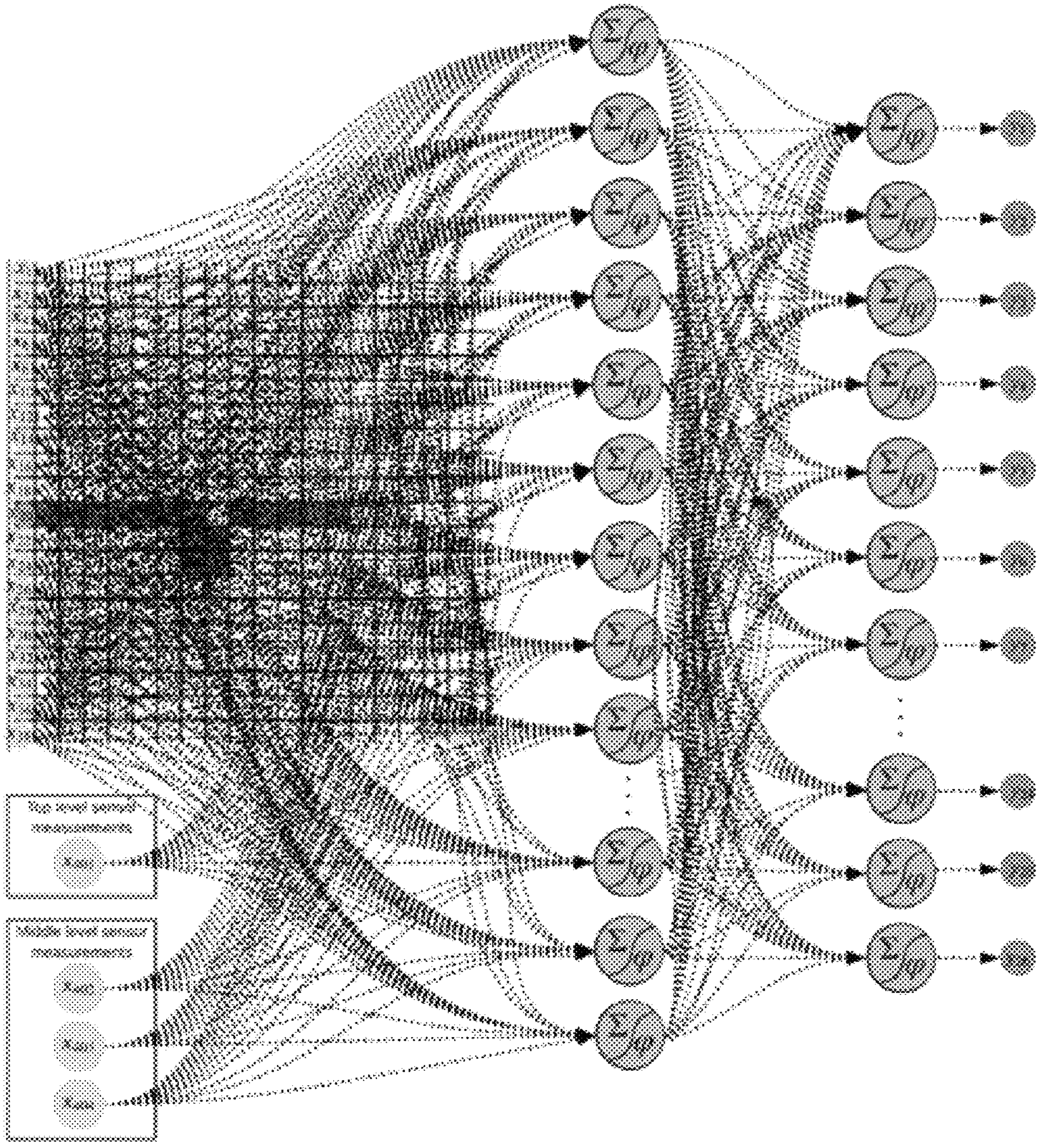
FIG. 13 is an example ANN for pattern classification of obstacles with the OD Method.

FIG. 13 is an example ANN 13000 for pattern classification of obstacles with the OD Method.

In some aspects, microcontroller 201 uses ANN with libraries including but not limited to KERAS and TensorFlow to classify top-level obstacle detection, regions of the middle-level obstacle detection, and the shape of the floor to classify an obstacle into categories such as a no obstacle, upstairs, downstairs, convex obstacle, concave obstacle, and the like.

In some aspects, ANN is comprised of hundreds of inputs. In some aspects, the ANN is composed of 404 inputs. In some aspects, the first 400 inputs are used to classify low-level objects, and the $401^{st}$ input corresponds to measurements of the ultrasonic sensor for the detection of high-level obstacles. The last inputs can be used to process the measurements from the mid-level obstacles. The total number of nodes in the first layer is 128 with a RELU activation function. The ANN may be composed of tens or hundreds of neurons in the output layer. In some aspects, the ANN may also be composed of 26 neurons in the output layer to use the SOFTMAX function to classify each class. The learning algorithm may be a stochastic gradient descent to optimize the synaptic weights, which are the parameters of the ANN.

In some examples, in the output layer, ANN generates 26 neurons corresponding to 26 different classes. In some examples, the rest of the outputs are referred to as top-level detection and each of the six different regions of middle-level obstacle detection. Even if the machine learning model of this disclosure is an artificial neural network, it is important to note that any machine learning model can be used to process the mentioned data framework in order to detect and classify the objects within the environment.

In some aspects, an OD Method is a method using the SAAI Wearable system 1000 to detect obstacles. When an OD Method is implemented in SAAI Wearable system 1000, it is used in an OD mode. In an OD mode, microcontroller 201 receives distance measurements from the sensor package 100 via signal transfer system 400. Different types of obstacle detection algorithms can be programmed into microcontroller 201 on mainboard 205 to detect obstacles. In some aspects, microcontroller 201 may compare the distance measurements from different sensors to decide the location of an obstacle. In some aspects, microcontroller 201 classifies the shape of an obstacle by analyzing distance measurements along the time as sensors move towards the obstacle using artificial intelligence ANN and proper libraries.

In some aspects, SAAI Wearable system 1000 has IoT capabilities, which allows it to connect to the network automatically. This allows SAAI Wearable system 1000 to continue recording data and send it to the cloud in order to use it for re-training the machine learning model. It should be noted that the ML model preloaded in SAAI Wearable system 1000 has been trained from a supervised approach since the output categorical variables were known. When SAAI Wearable system 1000 starts to capture data online, the re-training system may use the captured data and classify it using clustering techniques, changing to an unsupervised approach, that is, the ML model can be responsible for learning from the patterns it has found during the day. to be able to re-train itself. In this way, the machine learning model is customized depending on the person who is using SAAI Wearable system 1000.

In addition to the OD Method, which enables the OD mode of a SAAI Wearable system 1000, in real life a person with compromised vision may desire to move from one point to another in a straight path. The PLN Method disclosed herein enables a user of SAAI Wearable system 1000 to move from one point to another in a straight path via the PLN mode of SAAI Wearable system 1000.

Figure 14:
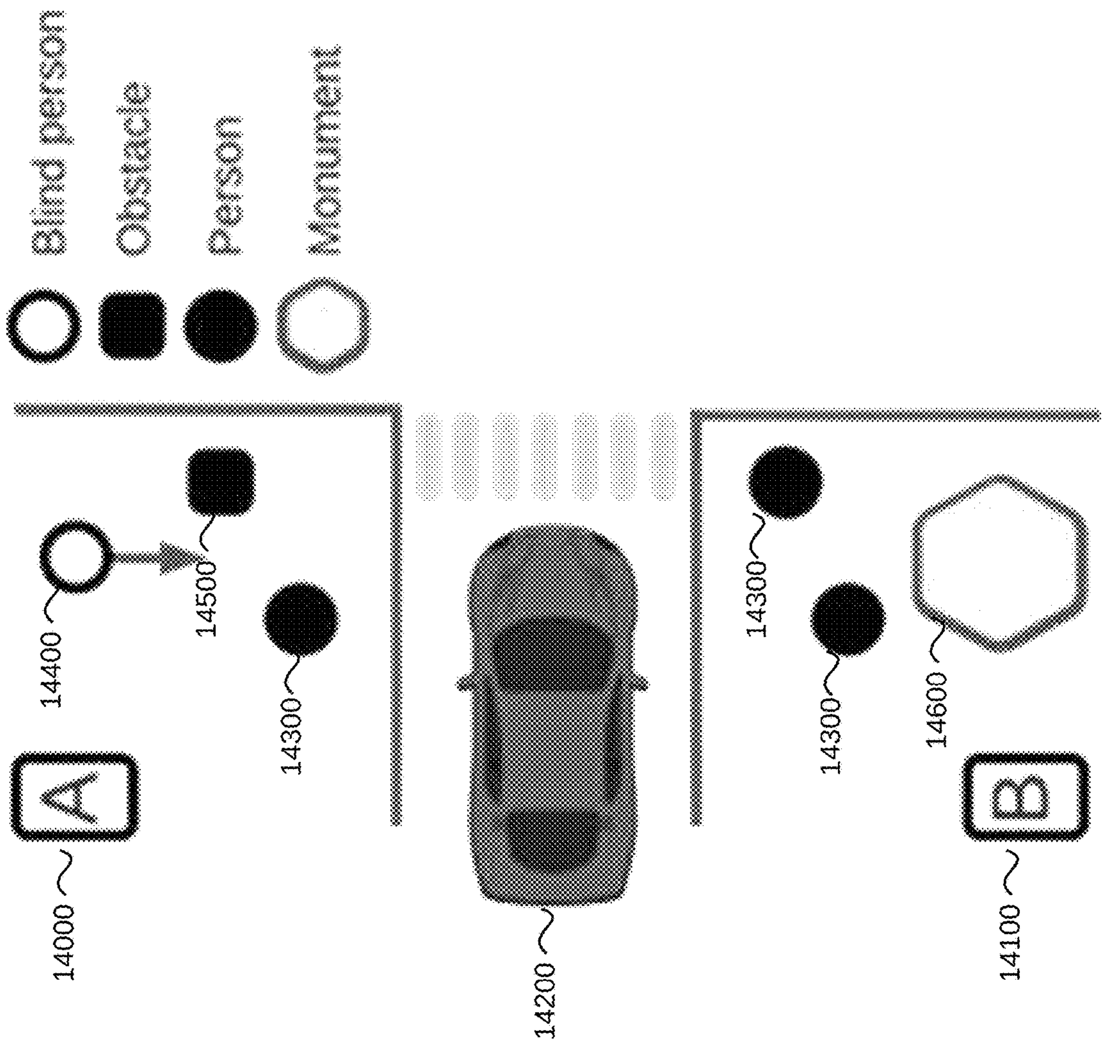
FIG. 14 is an illustration depicting an example situation where a blind person needs to move from Block A to Block B without colliding with static obstacles or dynamic objects.

FIG. 14 is an illustration depicting an example situation where a blind person 14400 needs to move from Block A 14000 to Block B 14100 without colliding with static obstacles 14500 including but not limited to a monument 14600, or a dynamic object including but not limited to another human being 14300 or a car 14200.

In some aspects, the PLN Method can apply data collected by the IMU 104 on a mainboard 205. As explained earlier, IMU 104 may comprise a 3D digital accelerometer, a 3D gyroscope, and a 3D digital magnetometer. The 3D digital accelerometer measures the acceleration rate a of IMU 104. The 3D gyroscope measures angular rate $\omega$ of IMU 104 around any defined axis, such as the x, y, or z axis.

When IMU 104 is moving with the person wearing it, IMU 104 sends its measured acceleration rates and angular rates to microcontrollers 201 on mainboard 205 to start the calculation of IMU 104's position change as a function of time using an algorithm that serves a PLN function. At any specific time, IMU 104's position is represented by roll ($\phi$), pitch ($\theta$), and yaw ($\psi$). Roll ($\phi$), pitch ($\theta$), and yaw ($\psi$) are three angular positions on x, y, z three perpendicular axes. In some examples, IMU 104, being a part of an SAAI Wearable system 1000, IMU 104's position represents the orientation of the user who is wearing the system. Based on the calculated position and speed of the user, the IMU 104 will alert the user when he is off the imaginary straight line. In some aspects, the sensor package 100 may include a GNSS receiver as an additional source to determine the position of the user of the SAAI Wearable system 1000. Examples of satellite signals the GNSS receiver may receive may include, but are not limited to, GPS, GLONASS, BeiDou, and Galileo. The GNSS receiver calculates the location of the SAAI Wearable system 1000 it is attached to via satellites which provide signals from space that transmit positioning and timing data to the GNSS receiver.

The following is an example algorithm illustrating one example for calculating IMU 104's angular position $\phi$, $\theta$, and $\psi$ using Madgwick Filter (MF) and the IMU 104 measured rotation rate and acceleration rate $\omega$ and $\alpha$.

In addition to a Madgwick Filter, other algorithms such as Mahony and Kalman filters can also calculate IMU 104's position. The difference among these filters is processing speed. Numbered equations are abbreviated as "Eq. (number)" in the following description.

Quaternion vector $q_G$ (see Eq. (2) in MF represents the orientation of the earth frame relative to the sensor frame of IMU 104. $q_G$ is calculated from angular rates about x, y, and z axes termed as $\omega_x$, $\omega_y$, and $\omega_z$, respectively (see Eq. (1)). These angular rates are measured by the gyroscope in IMU 104. q is initialized in its first iteration at zero, and then computed by the calculation of differential equations discussed below. Upon its calculation, q is a preset value.

$$\dot{q}_G = \frac{1}{2}\hat{q} \times \omega \tag{1}$$

$$\omega = [0 \quad \omega_x \quad \omega_y \quad \omega_z] \tag{2}$$

The orientation of the earth frame at any time t is computed by an integration method as shown by Eq. (3) and (4), where $\omega_t$ is the angular rate measured by the 3D gyroscope at time t. $\hat{q}_{est,t}$ represents an estimated orientation calculated by Eq. (15) below. Eq. (4) represents Euler's integration method which computes a trajectory of Eq. (3).

$$\dot{q}_{\omega,t+1} = \frac{1}{2}\hat{q}_{est,t} \times \omega_t \tag{3}$$

$$q_{\omega,t+1} = \hat{q}_{est,t} + \dot{q}_{\omega,t}\Delta t \tag{4}$$

Eq (5) is then used to compute the orientation of IMU 104 where $\hat{q}$ represents a sensor orientation, $\hat{d}$ represents a predefined direction of the gravity field in the earth frame, $\hat{s}$ represents a measured direction of the gravity field in a sensor field. $q^{\cdot}_1$, $q^{\cdot}_2$, and $q^{\cdot}_3$ are calculated from Eq. (10).

$$\min_{\hat{q} \in R^4} f(\hat{q}, \hat{d}, \hat{s}), \tag{5}$$

$$f(\hat{q}, \hat{d}, \hat{s}) = \hat{q}^{*} \times \hat{d} \times \hat{q} - \hat{s} \tag{6}$$

$$\hat{q} = [q_0 \quad q_1 \quad q_2 \quad q_3] \tag{7}$$

$$\hat{d} = [0 \quad d_x \quad d_y \quad d_z] \tag{8}$$

$$\hat{s} = [0 \quad s_x \quad s_y \quad s_z] \tag{9}$$

For any given measurement of Eq. (5), Eq. (5) will generate multiple solutions, the most optimal solution is calculated by a gradient descent algorithm as shown below from Eq. (10) to Eq. (13) where f represents the cost function, and J represents the Jacobian matrix of f. $\eta_t$ represents the learning rate or integration step. An optimal value of $\eta_t$ is defined as the value which is the behavior of $q_k$ converge. Therefore, $\eta_t$ can be computed by Eq. (14). Other optimization algorithms exist, but the algorithm used here runs the fastest.

$$q_{k+1} = \hat{q}_k - \eta_t \frac{\nabla f(\hat{q}, \hat{d}, \hat{s})}{\|\nabla f(\hat{q}, \hat{d}, \hat{s})\|}, \tag{10}$$

$$k = 1, 2, 3, \ldots, n$$

$$\nabla f(\hat{q}_k, \hat{d}, \hat{s}) = J^T(\hat{q}_k, \hat{d}) f(\hat{q}_k, \hat{d}, \hat{s}), \tag{11}$$

$$f(\hat{q}_k, \hat{d}, \hat{s}) = \begin{bmatrix} 2d_x(0.5 - q_2^2 - q_3^2) + 2d_y(q_0q_3 + q_1q_2) + 2d_z(q_1q_3 - q_0q_2) - s_x \\ 2d_x(q_1q_2 - q_0q_3) + 2d_y(0.5 - q_1^2 - q_3^2) + 2d_z(q_0q_1 + q_2q_3) - s_y \\ 2d_x(q_0q_2 + q_1q_0) + 2d_y(q_2q_3 - q_0q_1) + 2d_z(0.5 - q_1^2 - q_2^2) - s_z \end{bmatrix} \tag{12}$$

$$J(\hat{q}_k, \hat{d}) = \tag{13}$$

-continued $$\left[\begin{matrix} 2d_yq_3 - 2d_zq_2 & 2d_yq_2 + 2d_zq_3 & -4d_xq_2 + 2d_yq_1 - 2d_zq_0 & -4d_xq_3 - \\ -2d_xq_3 + 2d_zq_1 & 2d_xq_2 - 4d_yq_1 + 2d_zq_0 & 2d_xq_1 + 2d_xq_1 & -2d_xq_0 - \\ 2d_yq_2 + 2d_yq_1 & 2d_xq_3 - 2d_yq_0 - 4d_zq_1 & 2d_xq_0 + 2d_yq_3 - 4d_zq_2 & 2d_x \end{matrix}\right.$$

$$\eta_t = \alpha\|\dot{q}_{\omega,t}\|\Delta t, \tag{14}$$

$$\alpha > 1$$

The estimated orientation of the sensor frame to the earth frame $q_{est,t}$ is calculated by an Exponential Moving Average filter (EMA) described in Eq. (15). An optimal value of $\gamma_t$ ensures the weighted divergence of $q_{\omega,t}$ is equal to the weighted convergence of $q_k$ as shown in Eq. (16). Thus, $\gamma_t$'s value is calculated by Eq. (17), where $\eta_t/\Delta t$ is the convergence of $q_k$ and $\beta$ represents the divergence rate of $q_w$ expressed as the magnitude of a quaternion derivative corresponding to the gyroscope measurement error.

$$q_{est,t} = \gamma_t q_k + (1 - \gamma_t) q_{\omega,t}, \tag{15}$$

$$0 \le \gamma_t \le 1$$

$$(1 - \gamma_t)\beta = \gamma_t \frac{\eta_t}{\Delta t} \tag{16}$$

$$\gamma_t = \frac{\beta}{\frac{\eta_t}{\Delta t} + \beta} \tag{17}$$

From Eq. (14), if $\alpha$ is large, then $\eta_t$ is large (seen in Eq. (14)). A large value of $\eta_t$ used in Eq. (10) means that $\hat{q}_{est,t}$ becomes negligible, and Eq. (10) can be re-written as follows:

$$q_k \approx -\eta_t \frac{\nabla f}{\|\nabla f\|} \tag{18}$$

Similarly, if $\alpha$ is large, then $\eta_t$ is large (seen in Eq. (14)). A large value of $\eta_t$ used in Eq. (17) means that $\beta$ becomes negligible, and Eq. (17) can be re-written as follows, and $\gamma_t$'s value is close to zero.

$$\gamma_t \approx \frac{\beta \Delta t}{\eta_t} \tag{19}$$

Substituting Eq. (4), (18), and (19) into Eq. (15), we obtain Eq. (20). Since $\gamma_t$'s value is close to zero, Eq. (20) can be re-written as shown following in Eq. (21), where $q^{\cdot}_{est,t}$ is the estimated rate of change of orientation defined by Eq. (22) and $\hat{q}^{\cdot}_{\varepsilon,t}$ is the direction of the error of $q^{\cdot}_{est,t}$ formulated by Eq. (23). Equations (21) and (23) show how the filter calculates the orientation of $q_{est,t}$ by numerical integration using the estimated orientation rate $q^{\cdot}_{est,t}$. The filter can compute $q^{\cdot}_{est,t}$ as the rate of change of orientation measured by the gyroscopes, $q^{\cdot}_{\omega,t}$ with the magnitude of the gyroscope measurement error, $\beta$, removed in the direction of the estimated error, $\hat{q}^{\cdot}_{\varepsilon,t}$, computed from accelerometer measurements.

$$q_{est,t} = \frac{\beta\Delta t}{\eta_t}\left(-\eta_t\frac{\nabla f}{\|\nabla f\|}\right) + (1-0)\left(\hat{q}_{est,t} + \dot{q}_{\omega,t}\Delta t\right) \tag{20}$$

$$q_{est,t+1} = \hat{q}_{est,t} + \dot{q}_{est,t}\Delta t \tag{21}$$

$$\dot{q}_{est,t} = \dot{q}_{\omega,t} - \beta\hat{\dot{q}}_{\varepsilon,t}, \tag{22}$$

$$\hat{\dot{q}}_{\varepsilon,t} = \frac{\nabla f}{\|\nabla f\|}, \tag{23}$$

A 6D representation $p \in R^6$ is a displacement in 3D plus a rotation defined using a specific case of Euler angles: roll (ϕ) on X-axis, pitch (θ) on the Y-axis, and yaw (ψ) on the Z-axis. This representation is as follows:

$$P = [\chi \ \gamma \ z \ \phi \ \theta \ \psi], \tag{24}$$

Eq. (25) shows one equation used to calculate the values of roll, pitch, and yaw from a quaternion dimensionless value measured by Madgwick Filter using data from the accelerometer and the gyroscope in IMU 104.

$$\begin{bmatrix}\phi\\ \theta\\ \psi\end{bmatrix} = \begin{bmatrix}\alpha\tan 2\left(2(q_0q_3 + q_1q_2),\ 1 - 2(q_2^2 + q_3^2)\right)\\ \sin^{-1}(2(q_0q_2 - q_1q_3))\\ \alpha\tan 2\left(2(q_0q_1 + q_1q_2),\ 1 - 2(q_1^2 + q_2^2)\right)\end{bmatrix} \tag{25}$$

Figure 15:
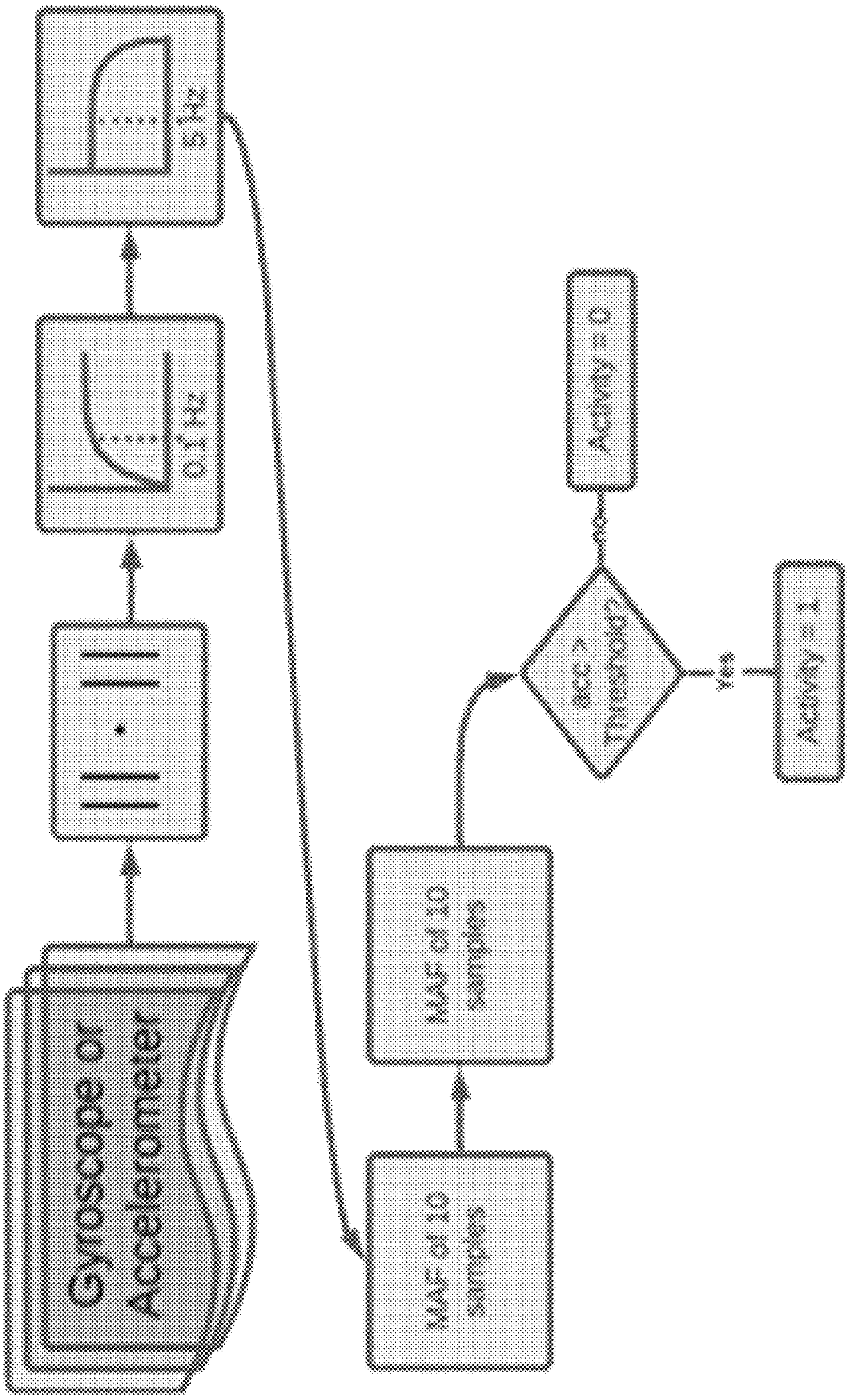
FIG. 15 shows an example method of detecting the activity of a person who wears an SAAI Wearable system.

FIG. 15 shows an example method 15000 of detecting the activity of a person who wears an SAAI Wearable system 1000.

To enable a person with compromised vision to walk on a preset path that the user defines when using the PLN mode, it is necessary to measure the speed and position of the person to decide whether this person deviates from the preset path. Such a position can be calculated using the acceleration rate measurement of the accelerometer in IMU 104 of an SAAI Wearable system 1000 worn by its user. In some aspects, after subtracting a gravitational value of the earth, the measured acceleration rate is used to calculate the speed and position of IMU 104 using Eq. (26) and Eq. (27), where α(t) represents the acceleration rate measurements provided by the IMU 104 after subtracting the gravitational value of the earth, t represents the time between sample-to-sample, v(t) represents the estimated velocity and s(t) represents the displacement of IMU 104 on its axis.

$$v(t) = \int_0^t a(t)d\tau = v_0 + at, \tag{26}$$

$$s(t) = \int_0^t v(t)d\tau = s_0 + vt + at^2, \tag{27}$$

To prevent drift of data from causing the integral above to diverge, a spectral analysis is performed on the data delivered by the accelerometer using Eq. (28), where ||a|| is an acceleration norm. accX, accY, and accZ represents the acceleration over axes x, y, and z respectively.

$$\|a\| = \sqrt{accX^2 + accY^2 + accZ^2} \tag{28}$$

The result of this spectral analysis is implemented by two filters to filter out noise. The first filter is a first-order high pass filter with a cutoff frequency of 0.1 Hz, while the second filter is a first-order low pass filter with a cutoff frequency of 5 Hz. The results obtained by the implementation are further implemented with two moving average filters with a size of 10 samples for each. Microcontroller 201 then uses a threshold value based on experience and experimental tests to differentiate IMU 104 on a person with activities more than breathing, speaking and moving arms from IMU 104 on a person with activities not more than breathing, speaking, and moving arms. In some aspects, when the activity is below the threshold value, the activity number is set to 0, which means the person wearing IMU 104 is not moving in a space. In some aspects, if the activity is above the threshold value, the activity number is set to 1, which means the person wearing IMU 104 is moving in a space. Once the moving status of IMU 104 is decided, microcontroller 201 may use accelerometer measured acceleration rates and Eq. (26) and (27) to calculate the speed and displacement of the person wearing IMU 104.

In some aspects, using the orientation of the person calculated by Madgwick Filter above as well as the speed and displacement calculated under FIG. 15, microcontroller 201 can determine whether a person wearing an SAAI Wearable system 1000 deviates from the preset path the user sets. If a person deviates from the preset path, microcontroller 201 will send electrical signals to drivers 202 and inform SAAI Wearable system 1000 users of the deviation via the actuator system 300 until the person walks back to the preset path.

Figure 16:
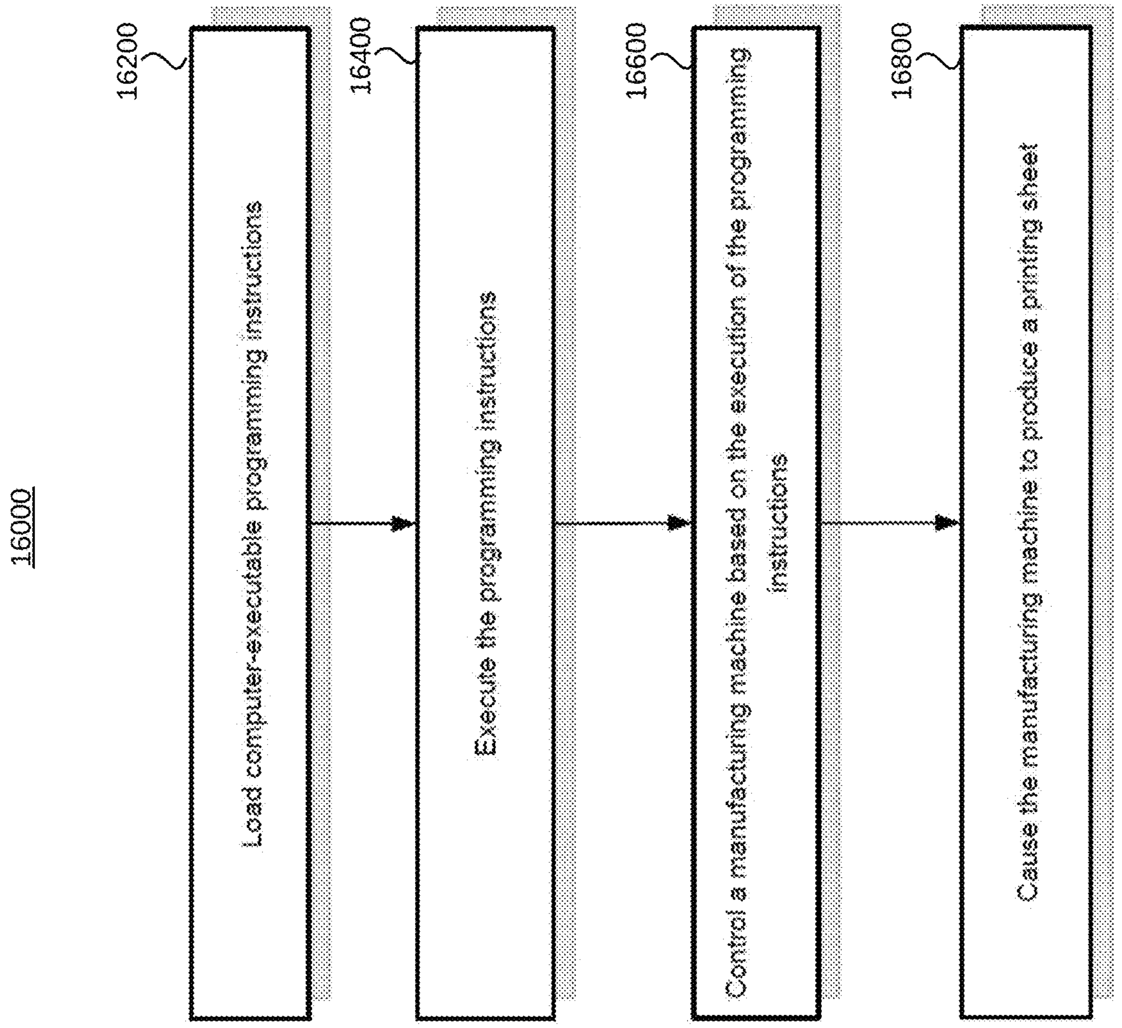
FIG. 16 is a flowchart illustrating an example computer-implemented method for manufacturing SAAI Wearable systems.

FIG. 16 is a flowchart illustrating an example computer-implemented method 16000 for manufacturing SAAI Wearable systems 1000. In some examples, computer system 17000 in FIG. 17, when properly programmed, executes the method 16000.

In some aspects, method 16000 includes using a computer to load 16200 computer-executable programming instructions from a non-volatile memory of the computer to a volatile memory of the computer.

After loading the programming instructions, the computer may execute 16400 the programming instructions using the volatile memory.

Based on the execution of the programming instructions, the computer may control 16600 a manufacturing machine, for example, a cutting machine, a molding machine, or a pressing machine.

By controlling the manufacturing machine, the computer causes 16800 the manufacturing machine to manufacture an SAAI Wearable system 1000.

Figure 17:
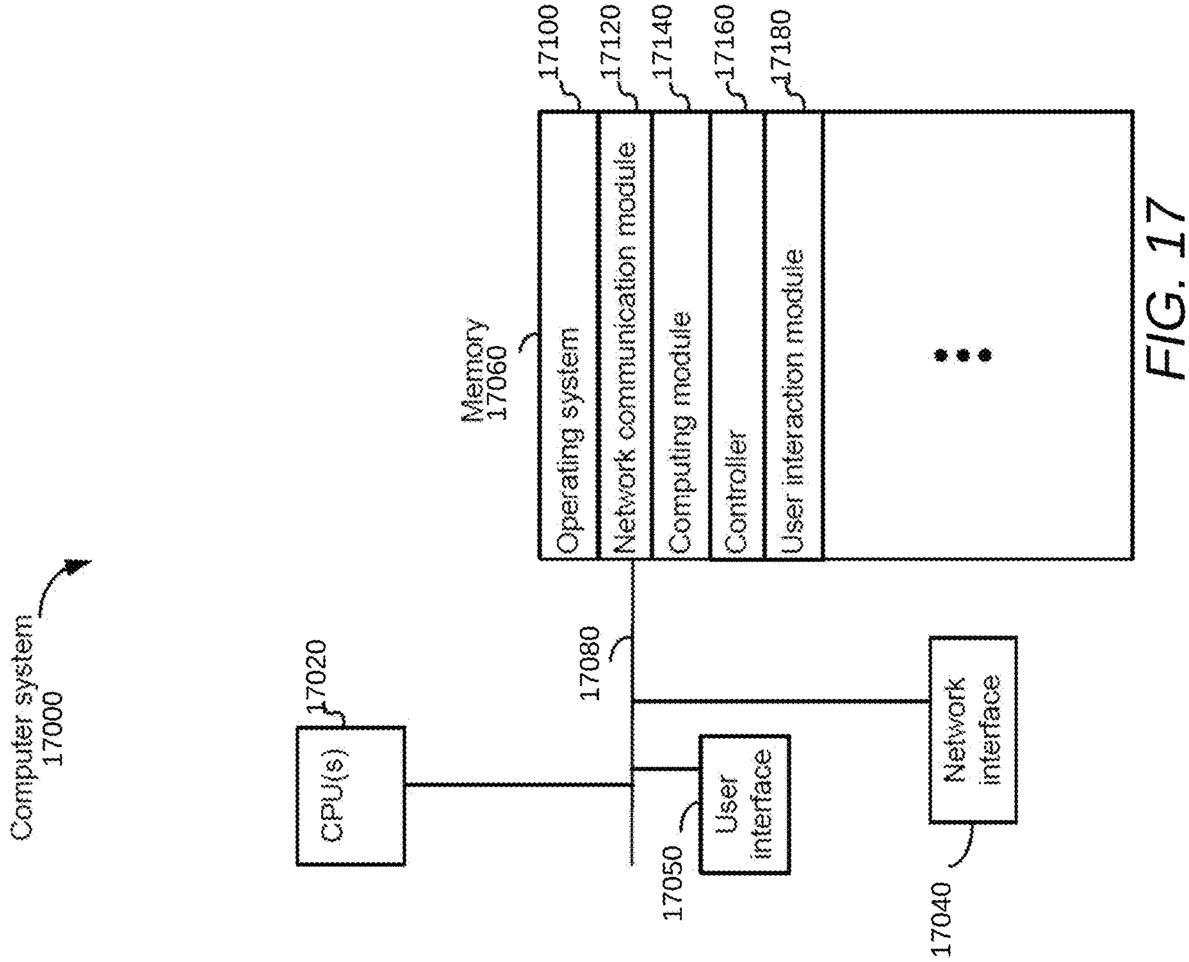
FIG. 17 is an example block diagram illustrating an example computer system for providing supply chain data management on a Blockchain Management System, in accordance with some aspects.

FIG. 17 is an example block diagram illustrating an example computer system for manufacturing SAAI Wearable systems 1000 according to some aspects.

In some aspects, computer system 17000 typically includes one or more processing units CPU(s) 17020 (also referred to as processors), one or more network interfaces 17040, memory 17060, one or more user interfaces 17050, and one or more communication buses 17080 for interconnecting these components. Communication buses 17080 optionally include circuitry (sometimes called a chipset) that interconnects and controls communications between system components. Memory 17060 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 17060 optionally includes one or more storage devices remotely located from CPU(s) 17020. In some aspects, memory 17060, or alternatively the non-volatile memory device(s) within the memory 17060, comprises a non-transitory computer readable storage medium. In some aspects, memory 17060 or alternatively the non-transitory computer readable storage medium stores the following programs, modules and data structures, or a subset thereof:

- an operating system 17100 (e.g., an embedded Linux operating system), which includes procedures for handling various basic system services and for performing hardware dependent tasks;
- a network communication module 17120 for connecting the computer system with a spraying component via one or more network interfaces (wired or wireless);
- a computing module 17140 for executing programming instructions;
- a controller 17160 for controlling a spraying component in accordance with the execution of programming instructions; and
- a user interaction module 17180 for enabling a user to interact with the computer system 17000.

In some aspects, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some aspects, memory 17060 optionally stores a subset of the modules and data structures identified above. Furthermore, the memory 17060 may store additional modules and data structures not described above.

Although FIG. 17 shows a "computer system 17000," FIG. 17 is intended more as a functional description of the various features which may be present in computer systems than as a structural schematic of the implementations described herein. In practice, and as recognized by those of ordinary skill in the art, items shown separately could be combined and some items could be separated.

The technology is operational with numerous other general purpose or special purpose computing system environments or configurations. Examples of computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and run under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In some aspects, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. In some aspects, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain aspects of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the aspects. It will also be appreciated by those of skill in the art that parts included in some aspects are interchangeable with other aspects; one or more parts from a depicted embodiment can be included with other depicted aspects in any combination. For example, any of the various components described herein and/or depicted in the Figures may be combined, interchanged or excluded from other aspects.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and aspects have been disclosed herein, other aspects and aspects will be apparent to those skilled in the art. The various aspects and aspects disclosed herein are for purposes of illustration and are not intended to be limiting.

The implementations disclosed herein are illustrated by way of example, and not by way of limitation, in the figures of the accompanying drawings. Like reference numerals refer to corresponding parts throughout the drawings.

What is claimed is:

1. A wearable navigation system, comprising:

a central processing unit (CPU) coupled to a sensor package, the sensor package attached at a first mounting surface of one or more mounting surfaces, the sensor package comprising one or more distance sensors and an inertial measurement unit (IMU), wherein the CPU is configured to:

receive a route to a destination;

monitor movement of the wearable navigation system using the IMU;

determine distance between objects in an environment based on signals received from the sensor package;

provide feedback signals using an actuator system in response to detecting objects within the route;

wherein the actuator system is coupled to the sensor package and a second mounting surface, and comprises one or more actuators attachable at a plurality of levels, the actuator system being configured to provide feedback at one or more of the plurality of levels based on a height of an object.

2. The wearable navigation system of claim 1, wherein the distance sensors include LiDAR, radar, and ultrasonic sensors.

3. The wearable navigation system of claim 1, wherein the inertial measurement unit comprises a 3D digital accelerometer, a 3D gyroscope, and a 3D digital magnetometer.

4. The wearable navigation system of claim 1, wherein the distance is determined by measuring the time of flight of signals to return to the sensor package from the object.

5. The wearable navigation system of claim 1, wherein the actuator system comprises one or more actuators attachable at a plurality of levels, the actuator system being configured to provide feedback at one or more of the plurality of levels based on a height of the object.

6. The wearable navigation system of claim 5, wherein the height of the object is determined based on which one of the distance sensors receives signals indicating the presence of the object.

7. The wearable navigation system of claim 1, wherein the sensor package includes a GNSS receiver.

8. The wearable navigation system of claim 1, wherein the feedback signals include vibration frequencies.

9. A method of navigation for a wearable navigation system, the method comprising:

receiving a route to a destination at a central processing unit (CPU);

monitoring movement of the wearable navigation system using data from an inertial measurement unit (IMU);

determining distances between objects in an environment based on signals received from one or more distance sensors included in a sensor package, wherein the sensor package is attached to a first mounting surface of the wearable navigation system;

detecting objects within the route using the distance sensors and analyzing the detected objects relative to the route;

providing feedback signals to a user in response to detecting objects within the route, the feedback signals generated by an actuator system coupled to the sensor package and attached to a second mounting surface of the wearable navigation system, and wherein the feedback signals provide feedback at one or more of the plurality of levels.

10. The method of claim 9, wherein the distance sensors include LiDAR, radar, and ultrasonic sensors.

11. The method of claim 9, wherein the inertial measurement unit comprises a 3D digital accelerometer, a 3D gyroscope, and a 3D digital magnetometer.

12. The method of claim 9, wherein the distance is determined by measuring the time of flight of signals to return to the sensor package from the object.

13. The method of claim 9, the method further comprising determining the height of the object based on which one of the distance sensors receives signals indicating the presence of the object.

14. The method of claim 8, wherein the sensor package includes a GNSS receiver.

15. The method of claim 8, wherein the feedback signals include vibration frequencies.

16. A non-transitory computer-readable storage medium comprising instructions stored therein, which when executed by one or more processors, cause the processors to perform operations comprising:

receiving a route to a destination at a central processing unit (CPU);

monitoring movement of the wearable navigation system using data from an inertial measurement unit (IMU);

determining distances between objects in an environment based on signals received from one or more distance sensors included in a sensor package, wherein the sensor package is attached to a first mounting surface of the wearable navigation system;

detecting objects within the route using the distance sensors and analyzing the detected objects relative to the route;

providing feedback signals to a user in response to detecting objects within the route, the feedback signals generated by an actuator system coupled to the sensor package and attached to a second mounting surface of the wearable navigation system, and wherein the feedback signals provide feedback at one or more of the plurality of levels.

17. The non-transitory computer-readable storage medium of claim 16, wherein the distance sensors include LiDAR, radar, and ultrasonic sensors.

18. The non-transitory computer-readable storage medium of claim 16, wherein the inertial measurement unit comprises a 3D digital accelerometer, a 3D gyroscope, and a 3D digital magnetometer.

19. The non-transitory computer-readable storage medium of claim 16, wherein the distance is determined by measuring the time of flight of signals to return to the sensor package from the object.

20. The non-transitory computer-readable storage medium of claim 16, wherein the feedback signals include vibration frequencies.

* * * * *